United States Patent
Chen

(10) Patent No.: US 11,758,434 B2
(45) Date of Patent: *Sep. 12, 2023

(54) DYNAMIC BUFFER ALLOCATION FOR BLUETOOTH LOW ENERGY ISOCHRONOUS TRANSMISSIONS

(71) Applicant: Harman International Industries, Incorporated, Stamford, CT (US)

(72) Inventor: Mien Chen, Richardson, TX (US)

(73) Assignee: Harman International Industries, Incorporated, Stamford, CT (US)

( * ) Notice: Subject to any disclaimer, the term of this patent is extended or adjusted under 35 U.S.C. 154(b) by 164 days.

This patent is subject to a terminal disclaimer.

(21) Appl. No.: 17/075,596

(22) Filed: Oct. 20, 2020

(65) Prior Publication Data

US 2022/0124553 A1 Apr. 21, 2022

(51) Int. Cl.
| | |
|---|---|
| *H04W 28/04* | (2009.01) |
| *H04W 4/80* | (2018.01) |
| *H04R 5/033* | (2006.01) |
| *H04L 5/00* | (2006.01) |
| *H04L 1/20* | (2006.01) |

(52) U.S. Cl.
CPC ............ *H04W 28/04* (2013.01); *H04L 1/203* (2013.01); *H04L 5/0055* (2013.01); *H04R 5/033* (2013.01); *H04W 4/80* (2018.02)

(58) Field of Classification Search
CPC ....... H04W 28/04; H04W 4/80; H04W 28/02; H04L 1/203; H04L 5/0055; H04L 65/00; H04L 1/18; H04R 5/033
See application file for complete search history.

(56) References Cited

U.S. PATENT DOCUMENTS

| | | | |
|---|---|---|---|
| 10,394,521 B1* | 8/2019 | Cramer | H03G 5/025 |
| 2001/0002910 A1* | 6/2001 | Kikuchi | H04W 8/04 |
| | | | 370/468 |
| 2005/0195821 A1* | 9/2005 | Yun | H04L 47/196 |
| | | | 370/392 |
| 2005/0271070 A1* | 12/2005 | Mikami | H04N 21/23406 |
| | | | 370/310 |
| 2007/0232222 A1* | 10/2007 | de Jong | H04N 21/2368 |
| | | | 455/3.06 |
| 2008/0089314 A1* | 4/2008 | Meyer | H04W 8/04 |
| | | | 370/349 |

(Continued)

OTHER PUBLICATIONS

Chen, M., "Sychronization of Bluetooth Low Energy Isochronous Transmissions," U.S. Appl. No. 17/075,590, filed Oct. 20, 2020, 91 pages.

(Continued)

*Primary Examiner* — Saumit Shah
(74) *Attorney, Agent, or Firm* — McCoy Russell LLP

(57) ABSTRACT

Mechanisms and methods are provided for improving wireless audio transmission and synchronization for multi-channel Bluetooth® Low Energy (BLE) systems. In various embodiments, mechanisms and methods may include generating transmissions having a plurality of Protocol Data Units (PDUs) to BLE-compliant slave devices. The plurality of PDUs may be stored in a buffer. When an error is determined to have occurred in transmitting one of the PDUs, a re-transmission to the slave device may be generated, which may include the PDU in error and any subsequent PDUs of the plurality of PDUs.

19 Claims, 23 Drawing Sheets

(56) References Cited

U.S. PATENT DOCUMENTS

| | | | |
|---|---|---|---|
| 2010/0257419 A1* | 10/2010 | Sung | G06F 11/1443 |
| | | | 714/E11.131 |
| 2012/0314598 A1* | 12/2012 | Sadek | H04W 16/14 |
| | | | 370/252 |
| 2015/0282088 A1* | 10/2015 | Weizman | H04W 4/80 |
| | | | 455/41.2 |
| 2016/0366695 A1* | 12/2016 | Ban | H04J 3/14 |
| 2017/0063704 A1* | 3/2017 | Krinsky | H04W 4/029 |
| 2017/0251469 A1* | 8/2017 | Lee | H04L 5/0055 |
| 2019/0045304 A1* | 2/2019 | Bhalla | H04R 3/12 |
| 2019/0327778 A1* | 10/2019 | Morris | H04W 88/04 |
| 2020/0053460 A1* | 2/2020 | Pedersen | H04W 4/80 |
| 2021/0037281 A1* | 2/2021 | Xian | H04N 21/2401 |
| 2022/0014302 A1* | 1/2022 | Hurwitz | H04N 21/6583 |
| 2022/0038769 A1* | 2/2022 | Meiyappan | H04N 21/42203 |
| 2022/0124553 A1* | 4/2022 | Chen | H04W 28/02 |

OTHER PUBLICATIONS

Chen, M., "Synchronization of Bluetooth Energy Transmissions Across Connected Isochronous Groups," U.S. Appl. No. 17/075,601, filed Oct. 20, 2020, 91 pages.

* cited by examiner

DYNAMIC BUFFER ALLOCATION FOR BLUETOOTH LOW ENERGY ISOCHRONOUS TRANSMISSIONS

FIELD

This disclosure relates to synchronization of Bluetooth Low Energy isochronous transmissions, such as for audio payloads sent from a source device to a plurality of target devices.

BACKGROUND

Data for an audio signal may be transmitted wirelessly from a source device to a plurality of target devices. Toward that end, systems may incorporate technology compliant with Bluetooth® specifications. (Bluetooth® is a registered trademark of the Bluetooth Special Interest Group, Incorporated, headquartered in Kirkland, Wash.) Some systems may incorporate technology compliant with Bluetooth® Low Energy (BLE) specifications, such as low-energy provisions of Revision v5.2 of the Bluetooth® Core Specification.

Various systems compliant with v5.2 BLE specifications may wirelessly transmit multiple channels of data substantially synchronously to different devices. Various systems may transmit a plurality of audio channels (which may include, for example, a left audio channel and a right audio channel), which may be intended for substantially synchronous playback. For example, a JBL® Bar 5.1 sound-bar-based system may transmit three channels (including two surround channels and one subwoofer channel) which are substantially synchronized to each other, and may potentially transmit to other wired speakers through wireless media. (JBL® is a registered trademark of Harman International Industries, Incorporated, headquartered in Stamford, Conn.) However, in complying with BLE specifications, "audio lacking" may occur, in which one or more data packets for an audio channel are lost or corrupted, but in order to avoid system under-run, after waiting for a limited hold time for the lost or corrupted data packets to be re-transmitted and received, other audio channels move ahead.

SUMMARY

Some other BLE-compliant systems (e.g., systems compliant with low-energy provisions of Revision v5.2 of the Bluetooth® Core Specification), such as headphones with True Wireless Stereo (TWS) capability, may also wirelessly transmit multiple channels of audio data. Such systems may also encounter similar problems and issues. In such systems, lost or corrupted data—which may be a result of transmission collisions over the air, or CODEC errors during audio processing—may trigger a re-transmission event. However, in order to maintain synchronization among all channels, channels without errors (e.g., channels without lost or corrupted data) may be disposed to holding transmissions until error channels (e.g., channels with lost or corrupted data) recover. If a re-transmission event reaches a flush point according to v5.2 BLE specifications, a system may play empty packets on error channels and may free transmission tokens on all channels to avoid an under-run. This may cause audio lacking in error channels.

BLE-compliant systems may also experience more transmission collisions than systems based on Bluetooth® Classic technology (such as Bluetooth® technology prior to Revision v5.2 of the Bluetooth® Core Specification), which may perform channel hopping even for re-transmission packets. However, re-transmitted packets for BLE-compliant audio may stay in the same wireless channel if they occur in the same ISO event. Thus, data loss or corruption conditions that cause audio lacking may be experienced more frequently and may degrade the quality of rendered audio.

Moreover, while the bandwidth of a single BLE-compliant link may fall short of some desired or target bandwidth, multiple BLE-compliant links could in theory carry more audio data to increase total bandwidth. However, current BLE-compliant systems might not provide sufficient features to handle synchronization of multiple BLE-compliant links.

Disclosed herein are mechanisms and methods for improving wireless audio transmission and synchronization for multi-channel BLE systems. Dynamically sized buffering, as discussed herein, may ameliorate or resolve issues related to audio lacking, and may also support functionalities such as automatic latency tuning and multiple-link BLE synchronization.

In some embodiments, the issues described above may be addressed by generating a plurality of data packages for transmission to a BLE-compliant slave device, storing the plurality of data packages in a transmit buffer having a storage depth of a number of data packages, determining whether an error has occurred in transmitting the plurality data packages, and dynamically adjusting the storage depth of the transmit buffer based upon a frequency of errors that occur in transmitting the plurality of data packages. In this way, a system may advantageously be able to trade off latency for reduced audio lacking.

In some embodiments, the issues described above may be addressed for systems having two or more BLE-compliant slave devices. A first set of PDUs may be generated for transmission to the first BLE-compliant slave device in a first event of a first CIS, then the first set of PDUs may be stored in a first transmit buffer having a first storage depth of a number of PDUs. A second set of PDUs may be generated for transmission to the second BLE-compliant slave device in a first event of a second CIS, then the second set of PDUs may be stored in a second transmit buffer having a second storage depth of a number of PDUs. It may then be determined, based upon detecting whether an error has occurred in transmitting the first set of PDUs, whether to dynamically adjust the first storage depth, and it may similarly be determined, based upon detecting whether an error has occurred in transmitting the second set of PDUs, whether to dynamically adjust the second storage depth. In this way, two or more BLE links may advantageously be able to dynamically adjust transmit buffer sizes and thereby optimize for latency and reduction of audio lacking.

In some embodiments, the issues described above may be addressed by wireless personal area network master devices having one or more antennas, one or more processors, and a memory for storing a plurality of instructions, such devices serving two or more BLE-compliant slave devices. When executed by the one or more processors, the instructions may generate a first plurality of PDUs for transmission to a first BLE-compliant slave device, then store the first plurality of PDUs in a first transmit buffer having a first storage depth of a number of PDUs. Proceeding, the instructions may generate a second plurality of PDUs for transmission to a second BLE-compliant slave device, then store the second plurality of PDUs in a second TX buffer having a second storage depth of a number of PDUs. It may then be determined, based upon a rate of detected errors that occur in transmitting PDUs to the first BLE-compliant slave device, whether to dynamically adjust the first storage depth, and it may also be determined, based upon a rate of detected errors that occur in transmitting PDUs to the second BLE-compliant slave device, whether to dynamically adjust the second storage depth. In this way, by dynamically adjusting the depths of transmit buffers based on rates of detected errors, latency may be traded off to reduce or avoid audio lacking.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
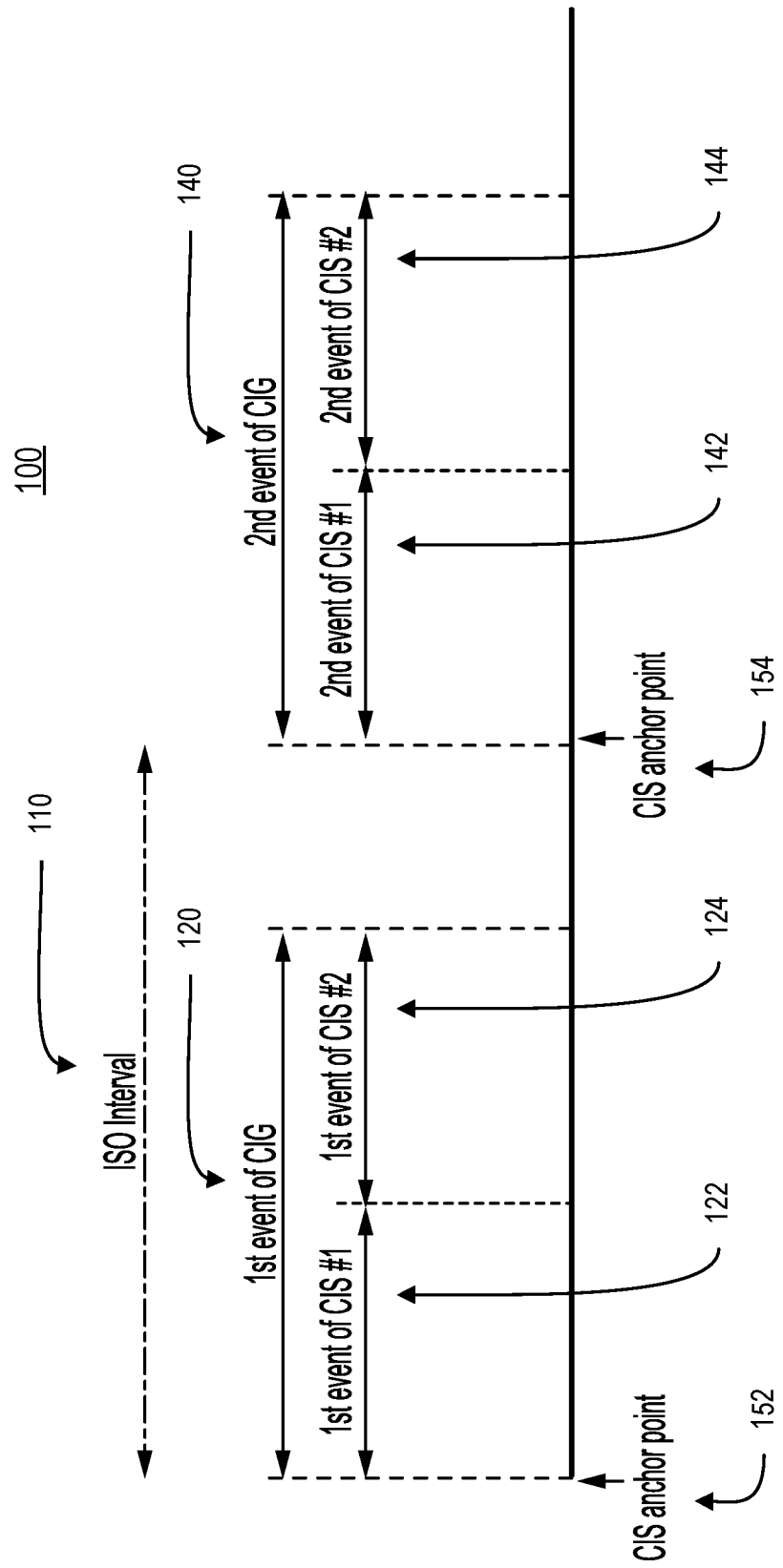
FIG. 1 illustrates a design of Bluetooth® Low Energy (BLE) isochronous intervals (ISO intervals), in accordance with one or more embodiments of the present disclosure.
Figure 2:
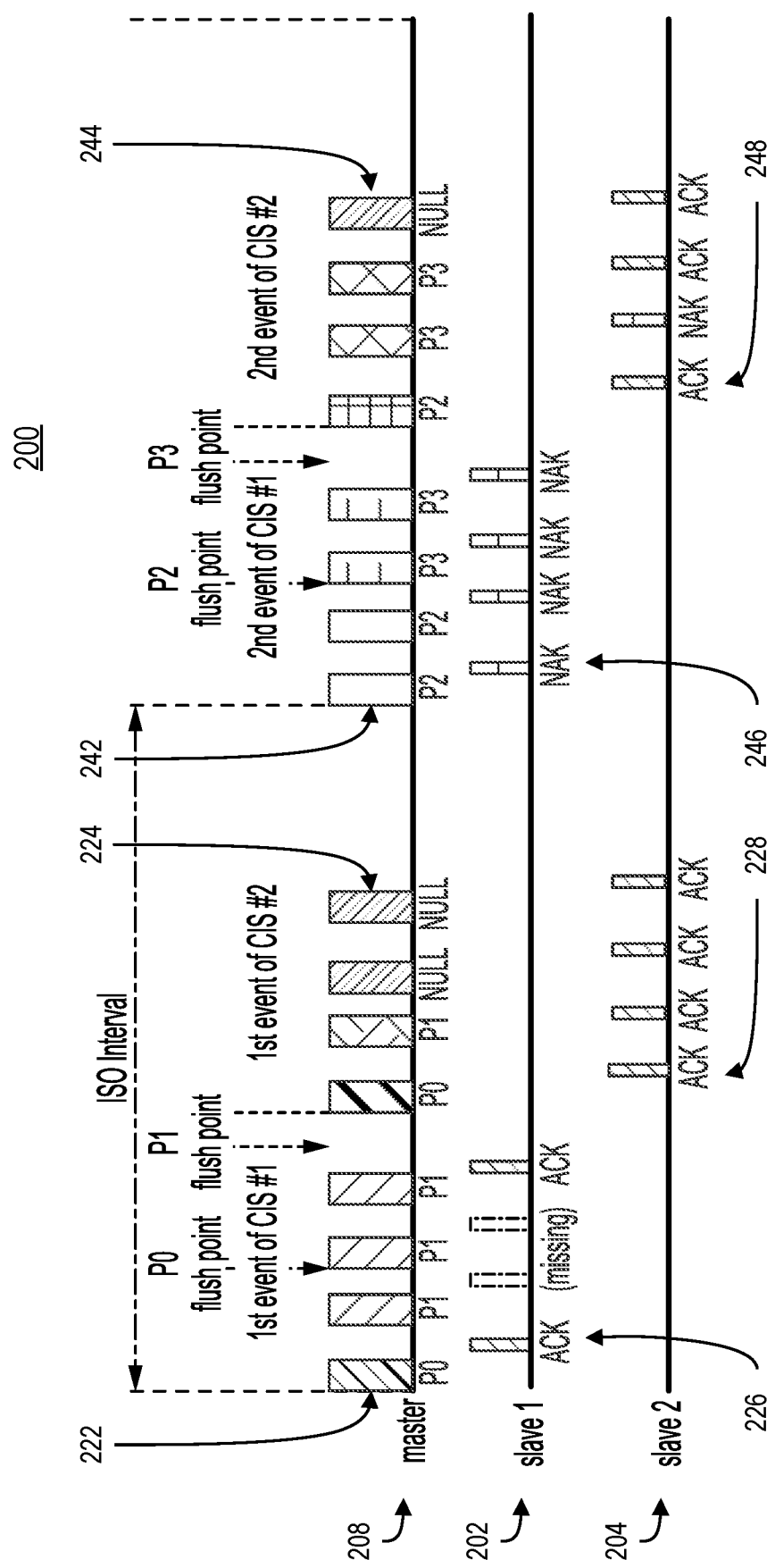
FIG. 2 illustrates a timing diagram for a scenario in which a BLE-compliant master device transmits to two BLE-compliant slave devices, in accordance with one or more embodiments of the present disclosure.
Figure 3:
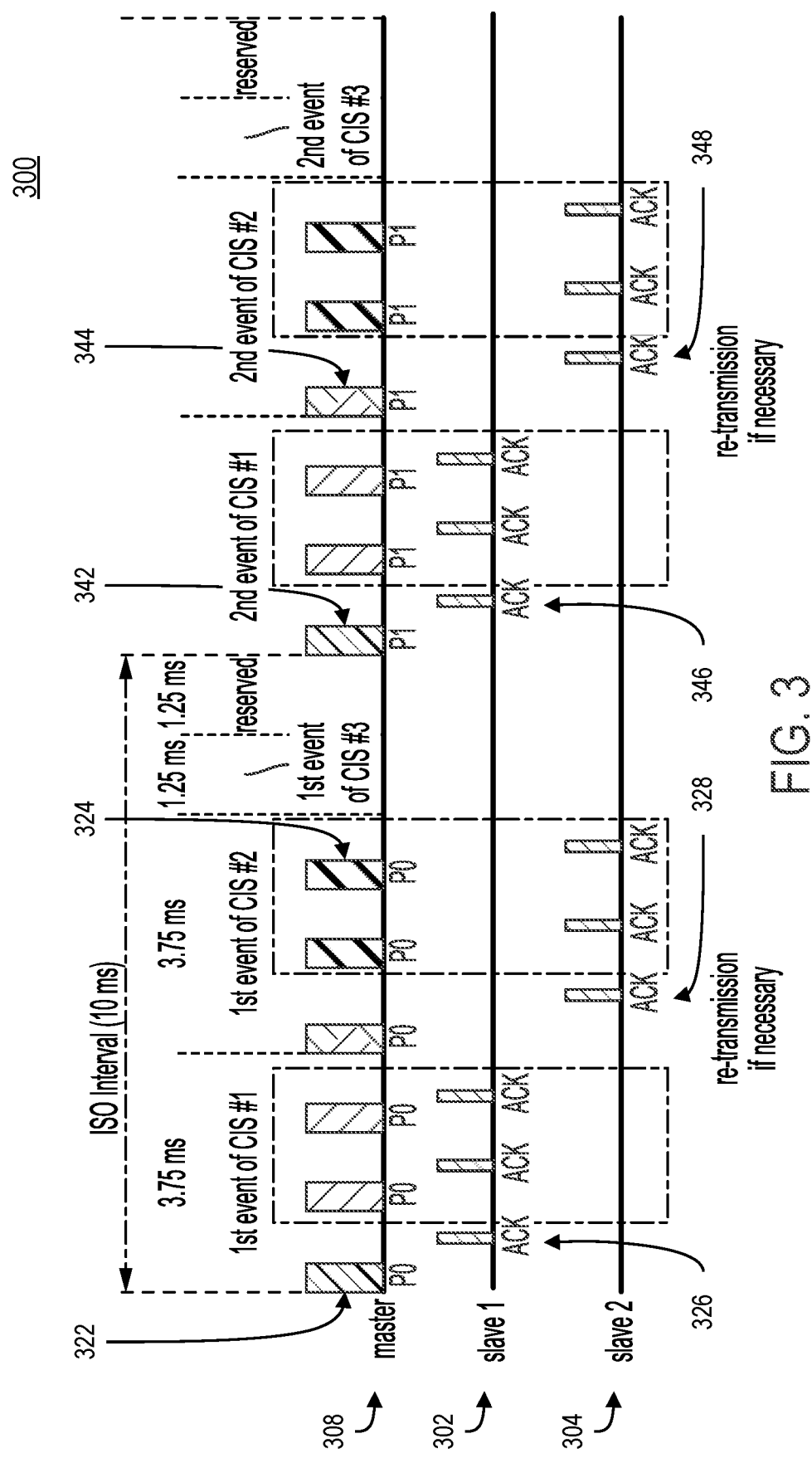
FIG. 3 illustrates a timing diagram for a scenario in which a BLE-compliant master device transmits to BLE-compliant slave devices associated with two Connected Isochronous Streams (CISes), with bandwidth allocation in 10 millisecond (ms) encoder/decoder (CODEC) windows, in accordance with one or more embodiments of the present disclosure.
Figure 4:
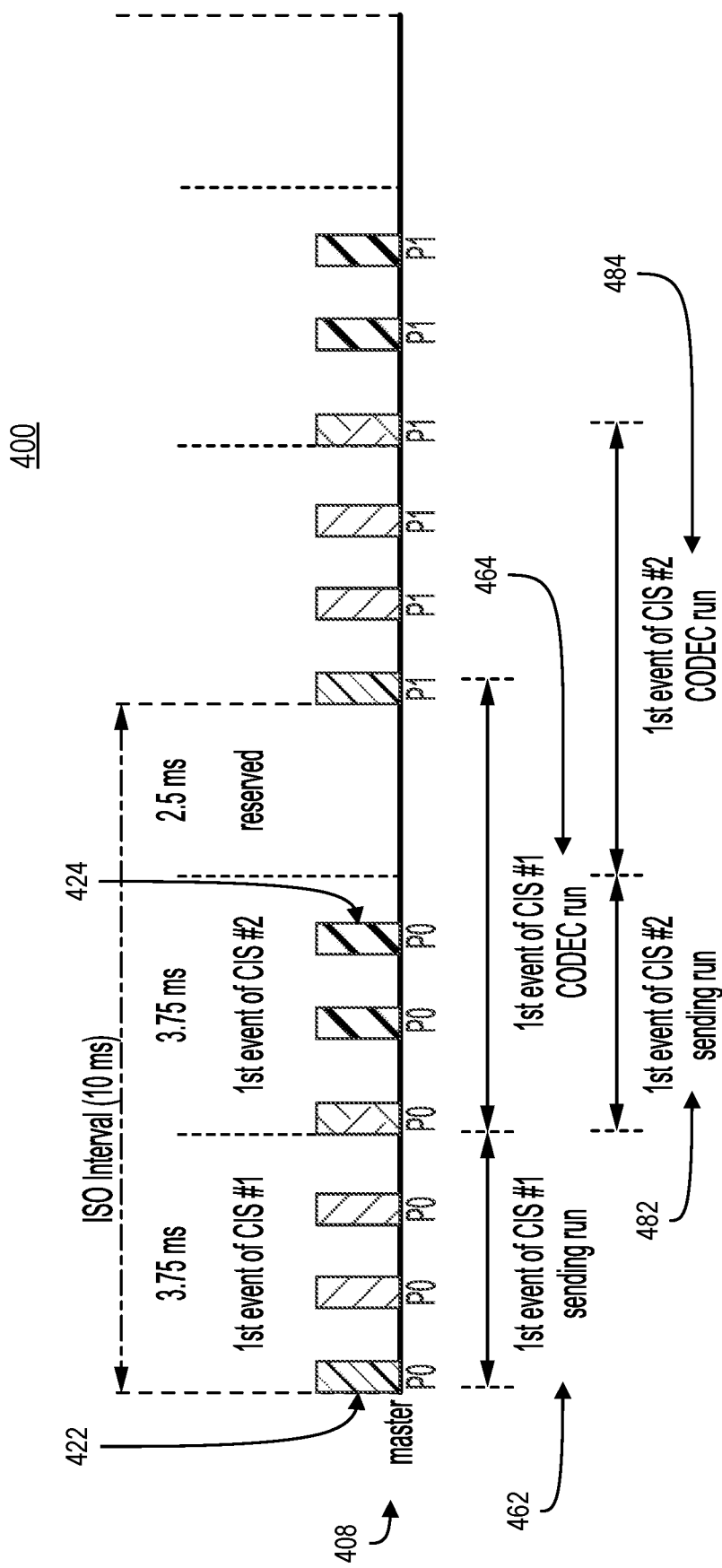
FIG. 4 illustrates a timing diagram for a scenario in which a BLE-compliant master device carries out a sending run and a CODEC run for two CISes, with bandwidth allocation in 10 ms CODEC windows, in accordance with one or more embodiments of the present disclosure.
Figure 5:
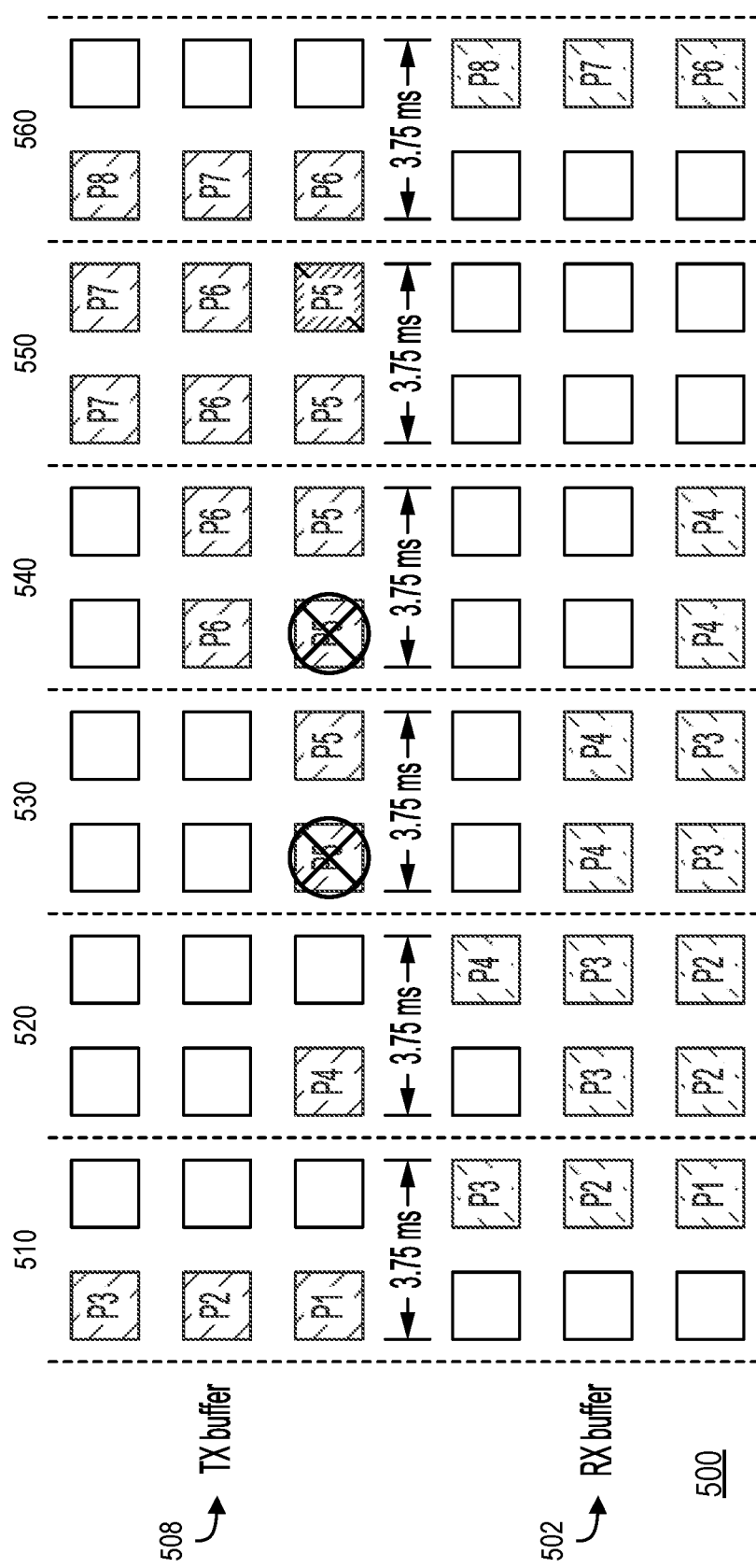
FIG. 5 shows a data flow diagram of a scenario in which data packages flow from three transmit-side (TX) buffers to three receive-side (RX) buffers across a plurality of events for one CIS, with 10 ms CODEC windows, in accordance with one or more embodiments of the present disclosure.
Figure 6:
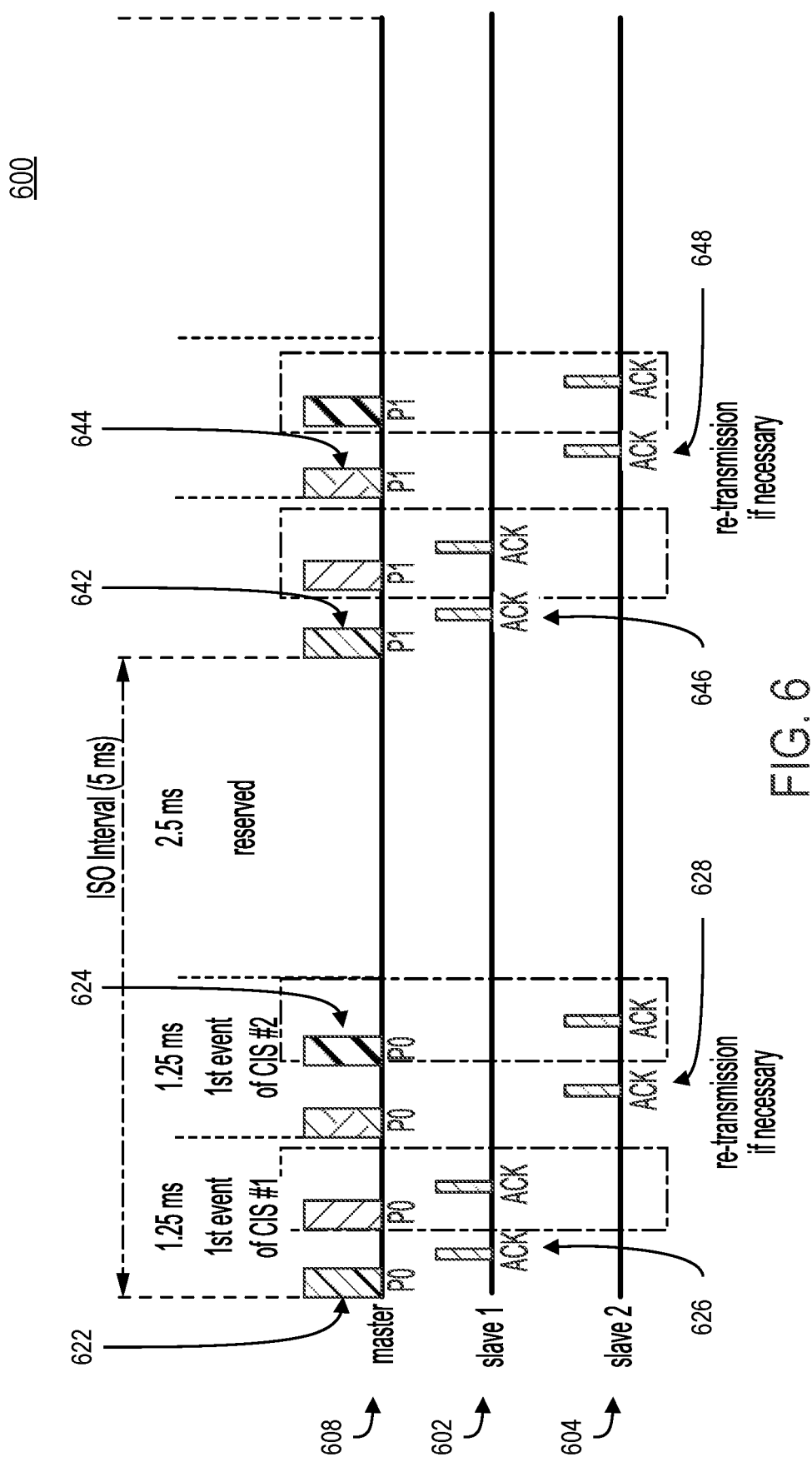
FIG. 6 illustrates a timing diagram for a scenario in which a BLE-compliant master device transmits to two BLE-compliant slave devices, with bandwidth allocation in 5 ms CODEC windows, in accordance with one or more embodiments of the present disclosure.
Figure 7:
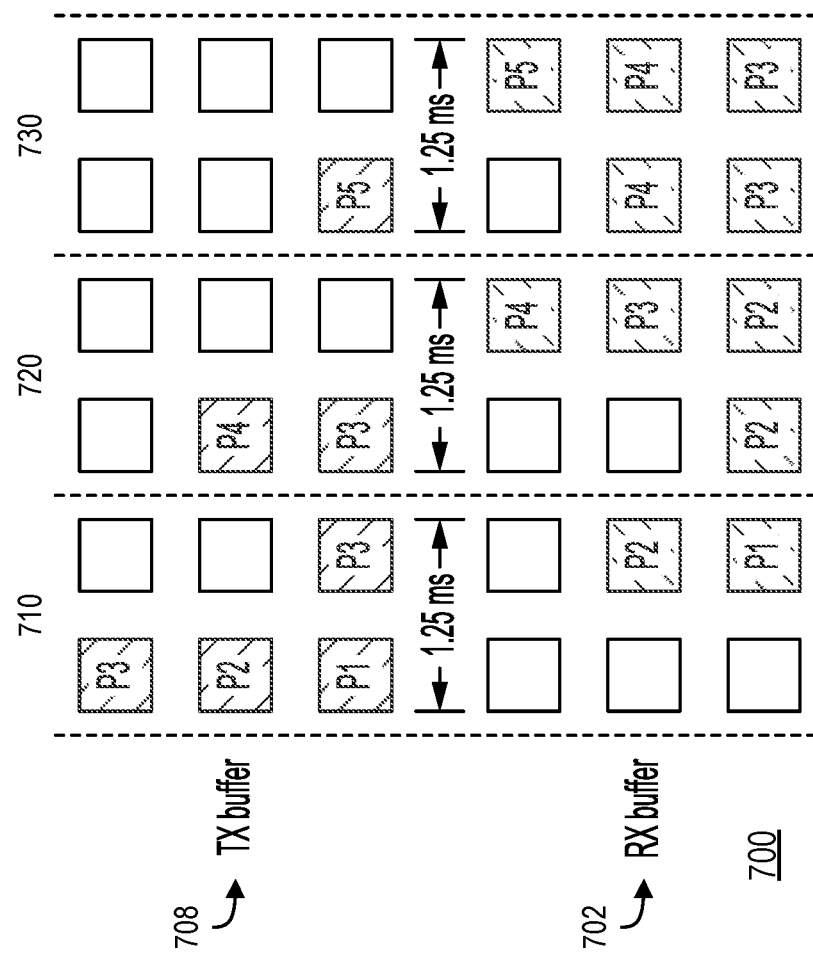
FIG. 7 shows a data flow diagram of a scenario in which data packages flow from three TX buffers to three RX buffers across a plurality of events for one CIS, with 5 ms CODEC windows, in accordance with one or more embodiments of the present disclosure.
Figure 8:
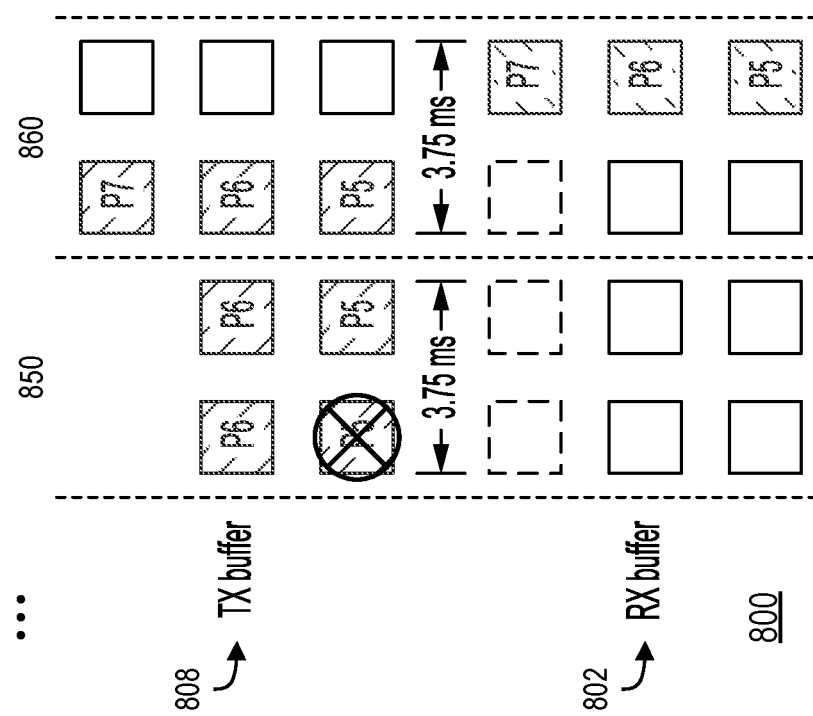
FIG. 8 shows a data flow diagram of a scenario in which data packages flow through a set of TX buffers and a set of RX buffers across a plurality of events for one CIS, with the number of buffers increasing dynamically, in accordance with one or more embodiments of the present disclosure.
Figure 9:
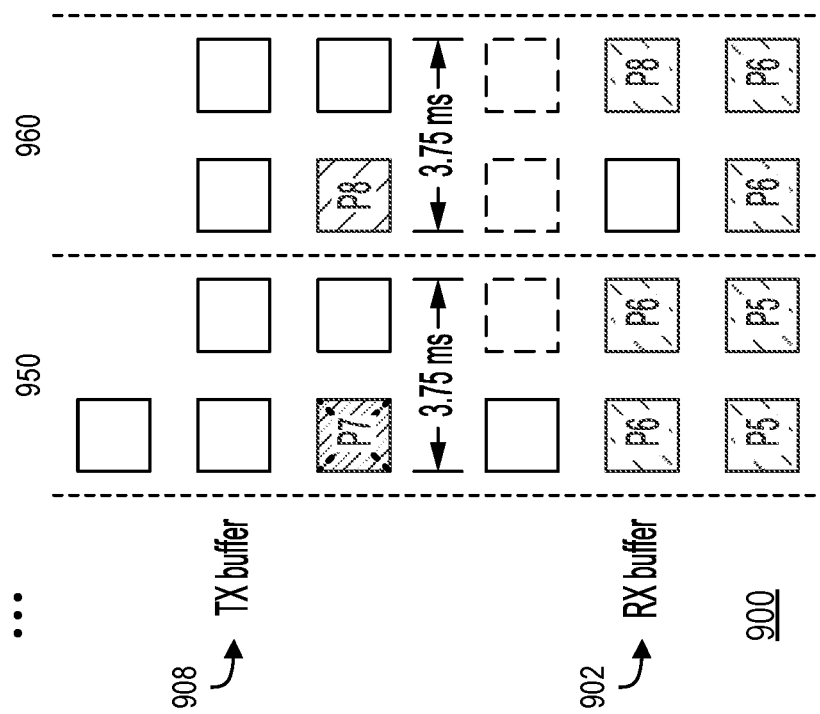
FIG. 9 shows a data flow diagram of a scenario in which data packages flow through a set of TX buffers and a set of RX buffers across a plurality of events for one CIS, with the number of buffers decreasing dynamically, in accordance with one or more embodiments of the present disclosure.
Figure 10:
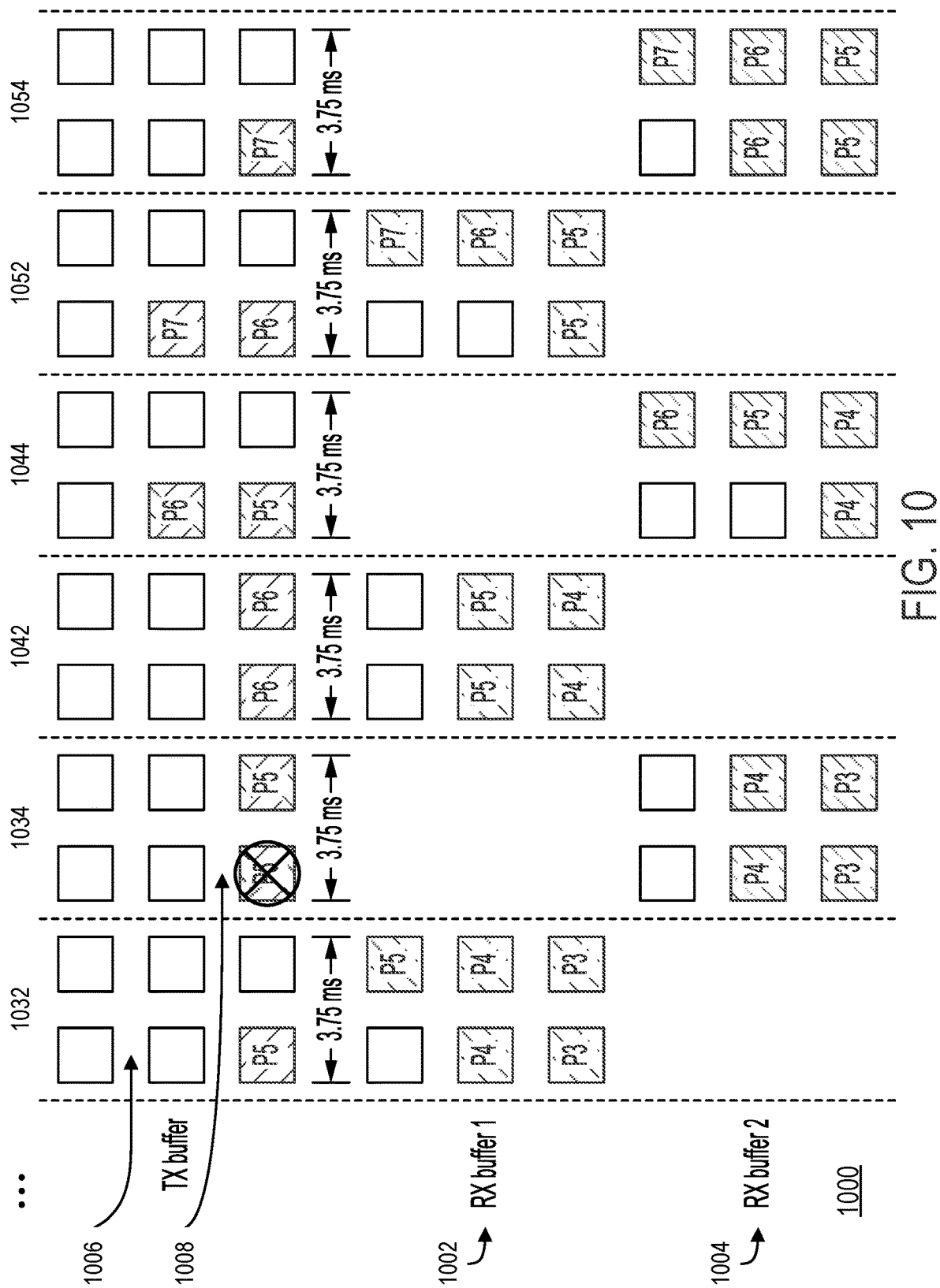
FIG. 10 shows a data flow diagram of a scenario in which synchronized data packages flow through a plurality of TX buffers and a plurality of RX buffers across a plurality of events for two CISes, in accordance with one or more embodiments of the present disclosure.
Figure 11:
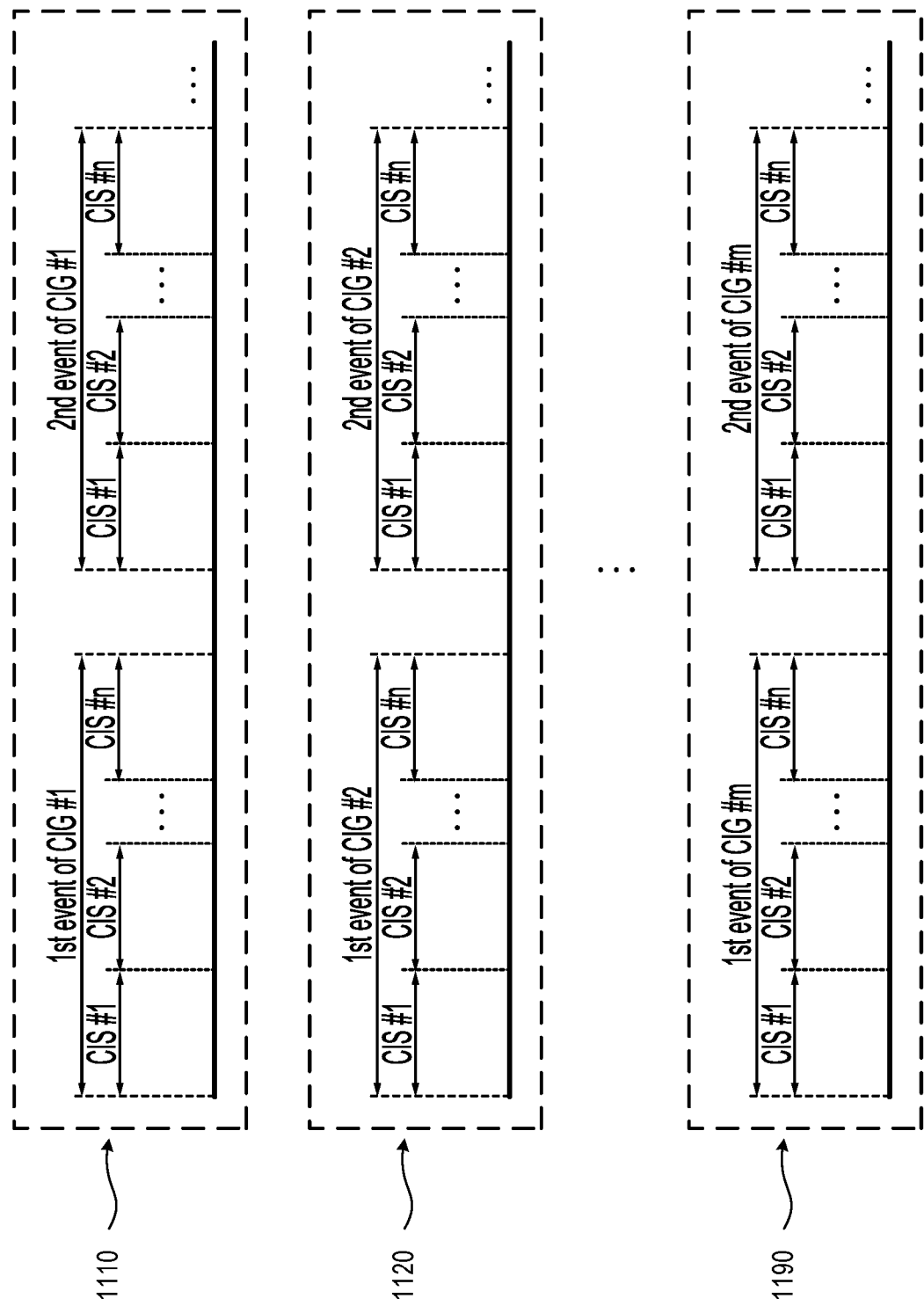
FIG. 11 illustrates a relationship between multiple CIGs, in accordance with one or more embodiments of the present disclosure.
Figure 12:
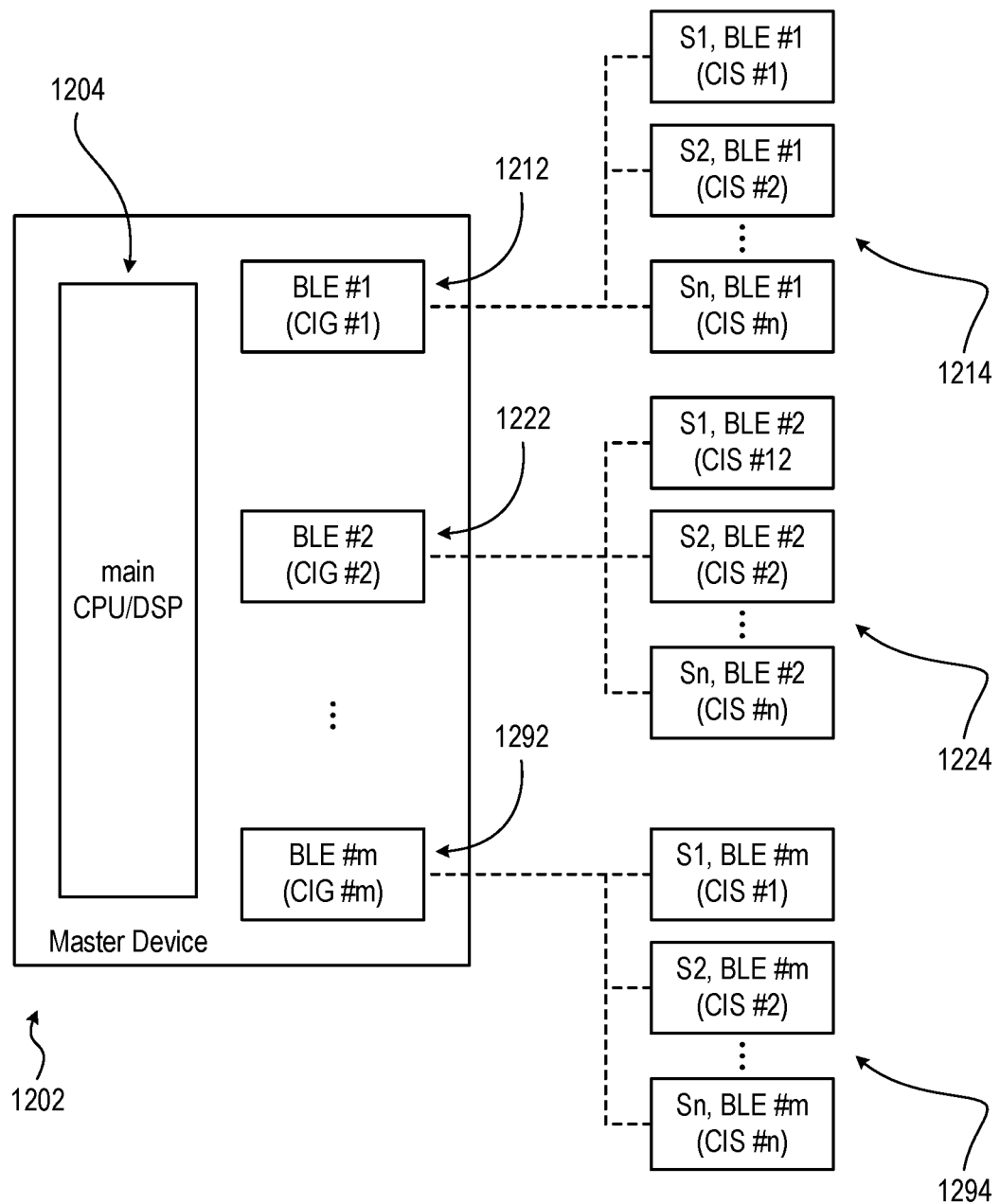
FIG. 12 illustrates a BLE master device connected with various BLE slave devices, in accordance with one or more embodiments of the present disclosure.
Figure 13:
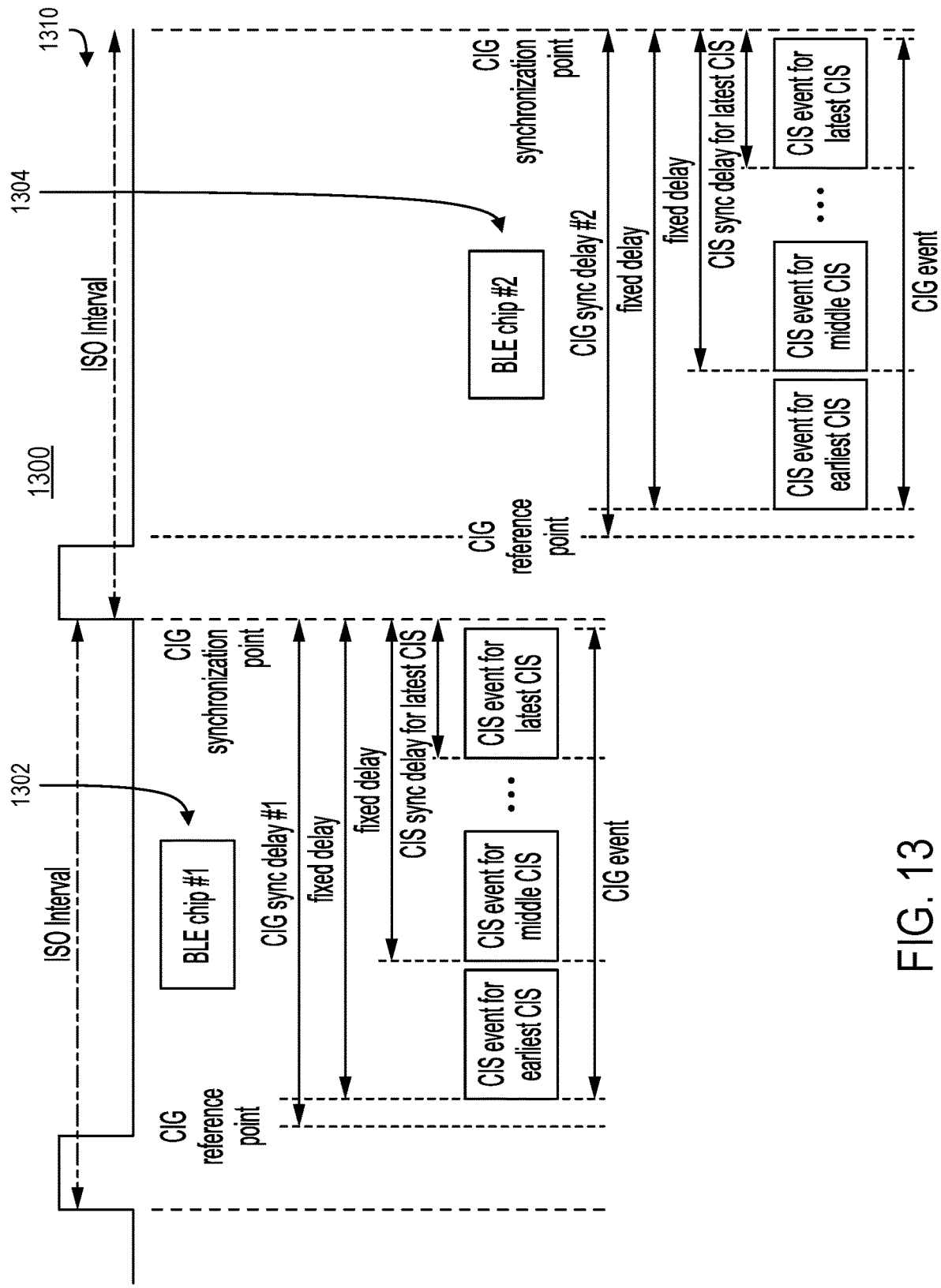
FIG. 13 illustrates a timing diagram of a scenario of clock synchronization among CIGs, in accordance with one or more embodiments of the present disclosure.
Figure 14:
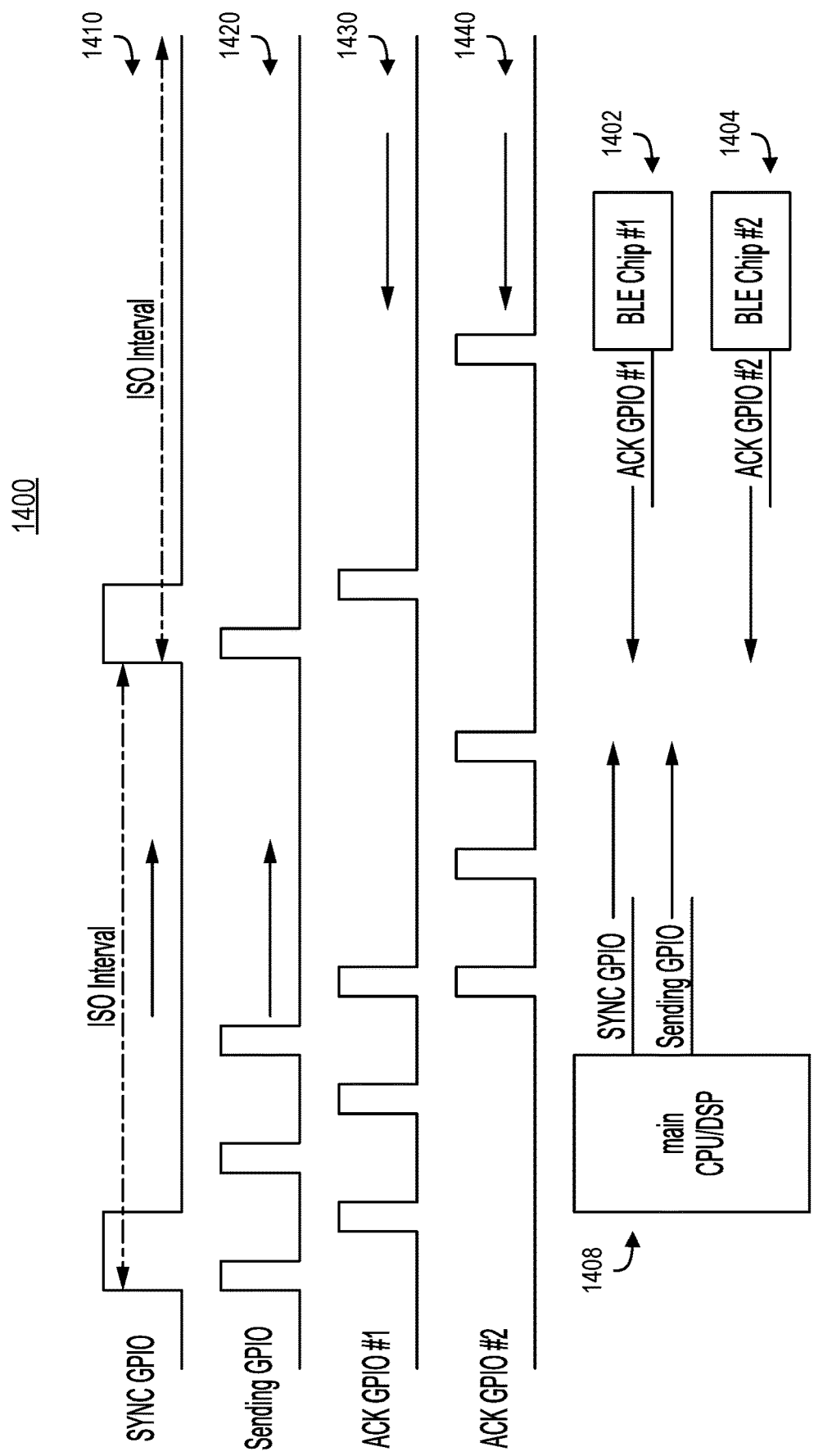
FIG. 14 illustrates a timing diagram of a scenario of CIG payload synchronization of two BLE RF components, in accordance with one or more embodiments of the present disclosure.
Figure 15:
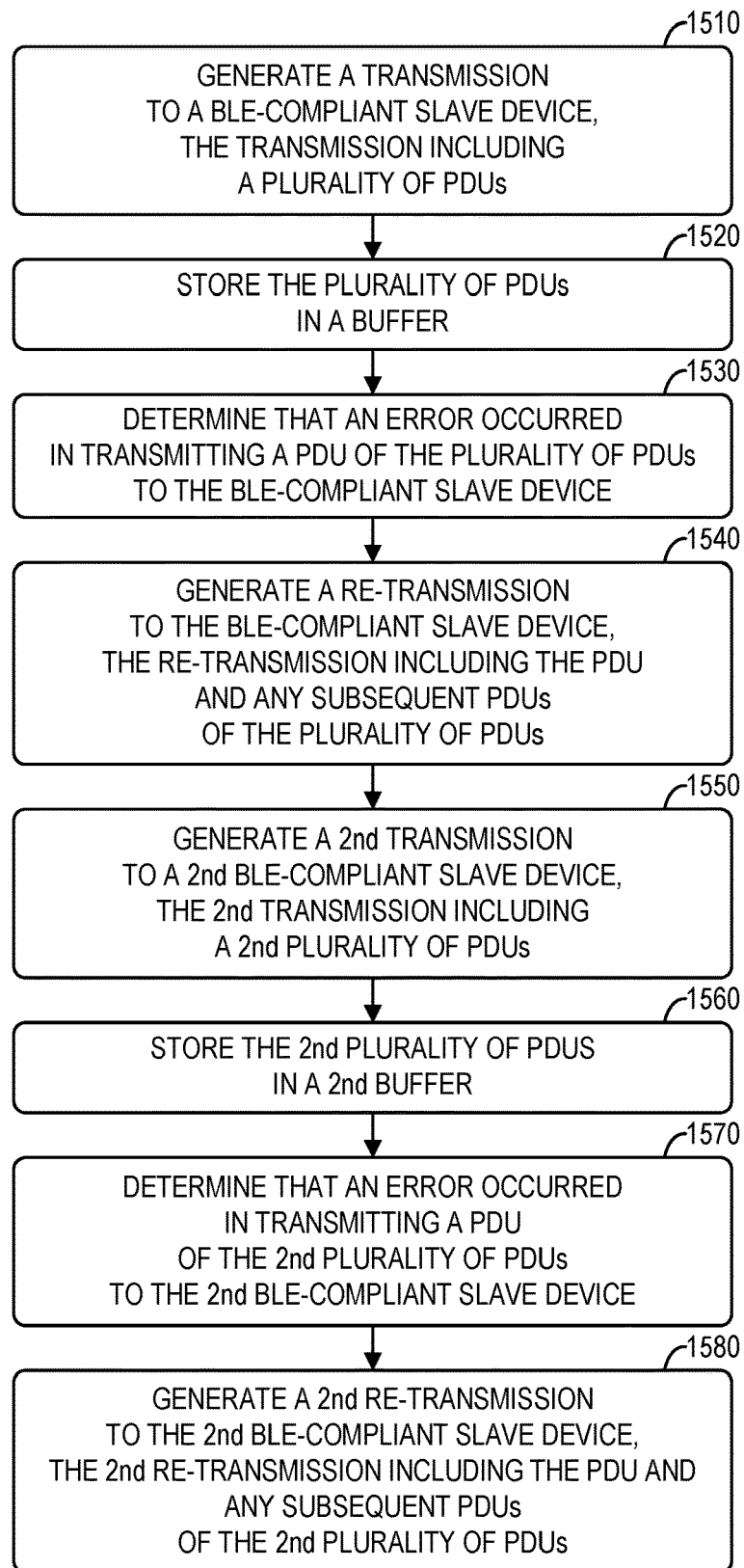
FIGS. 15-17 show example methods for facilitating BLE transmission and synchronization, in accordance with one or more embodiments of the present disclosure.
Figure 16:
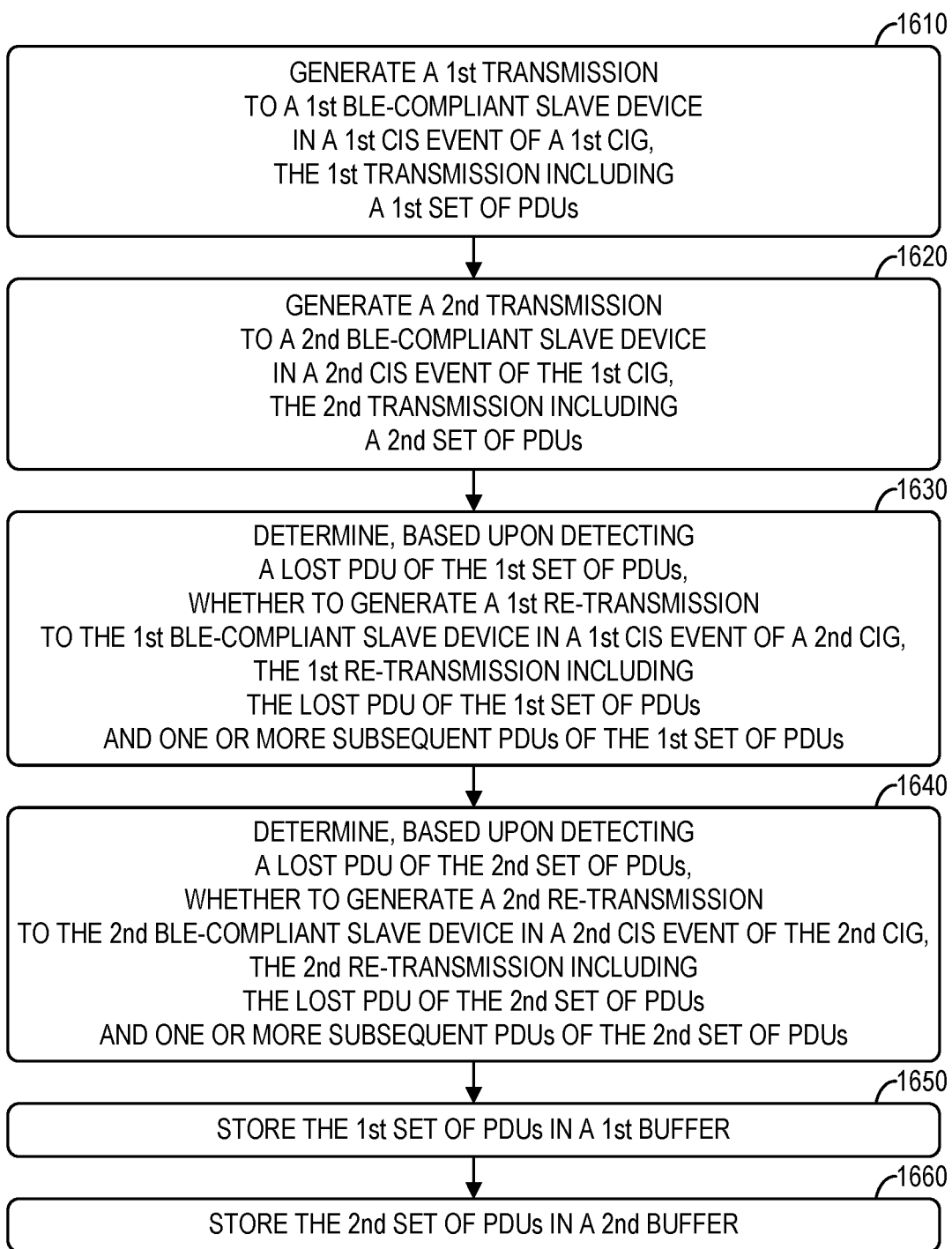
Figure 17:
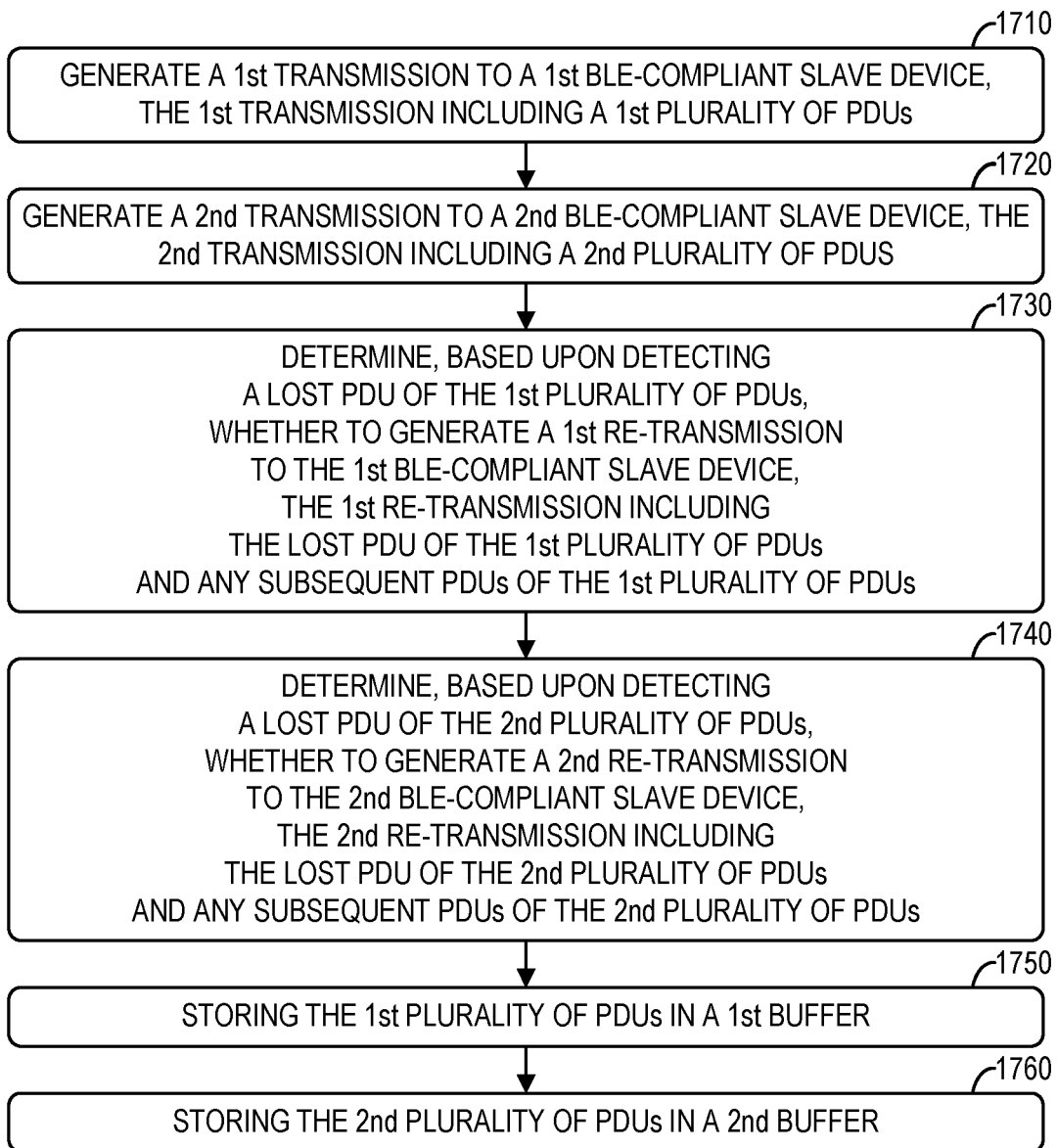
Figure 18:
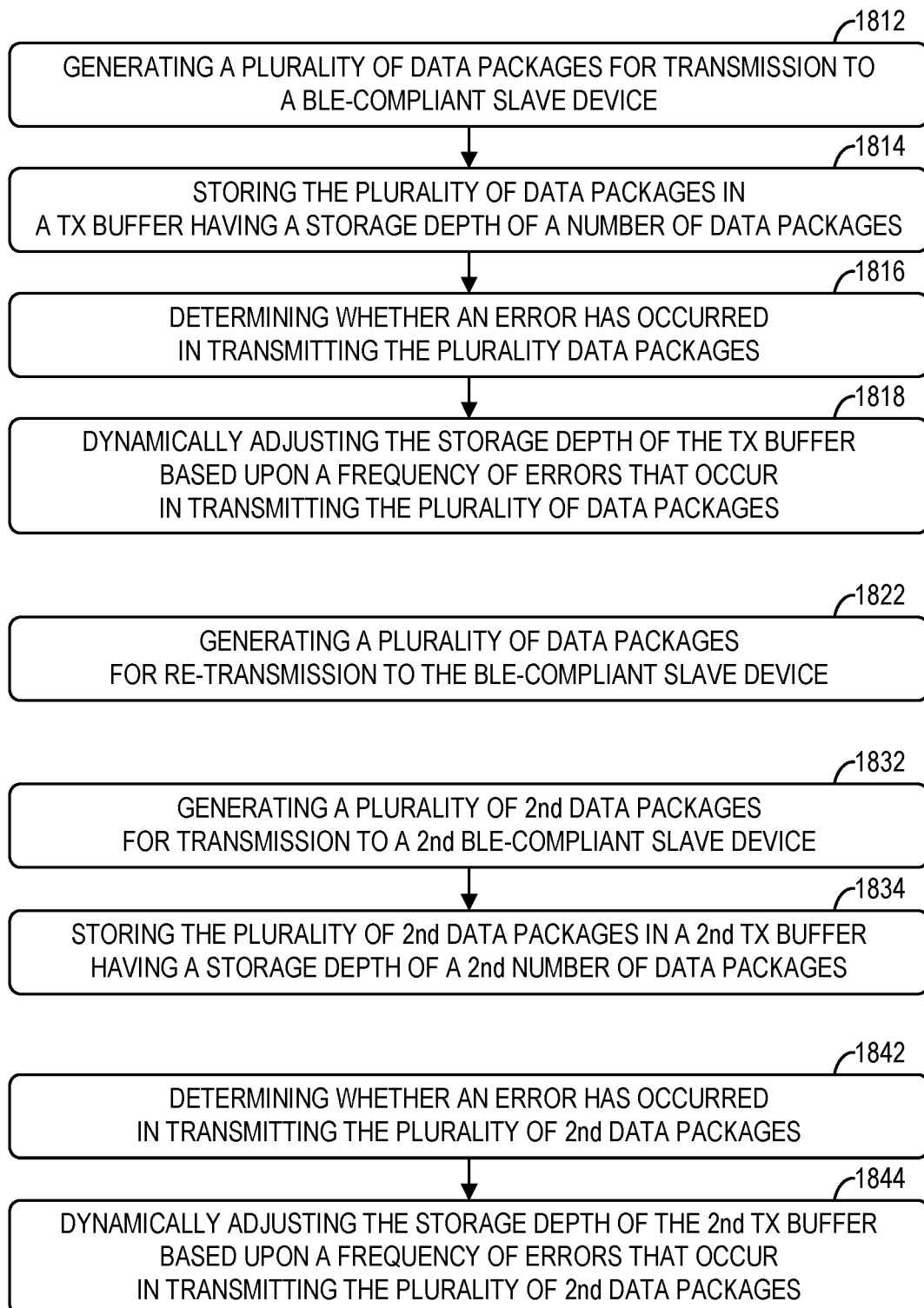
FIGS. 18-20 show example methods for facilitating BLE dynamic buffer sizing, in accordance with one or more embodiments of the present disclosure.
Figure 19:
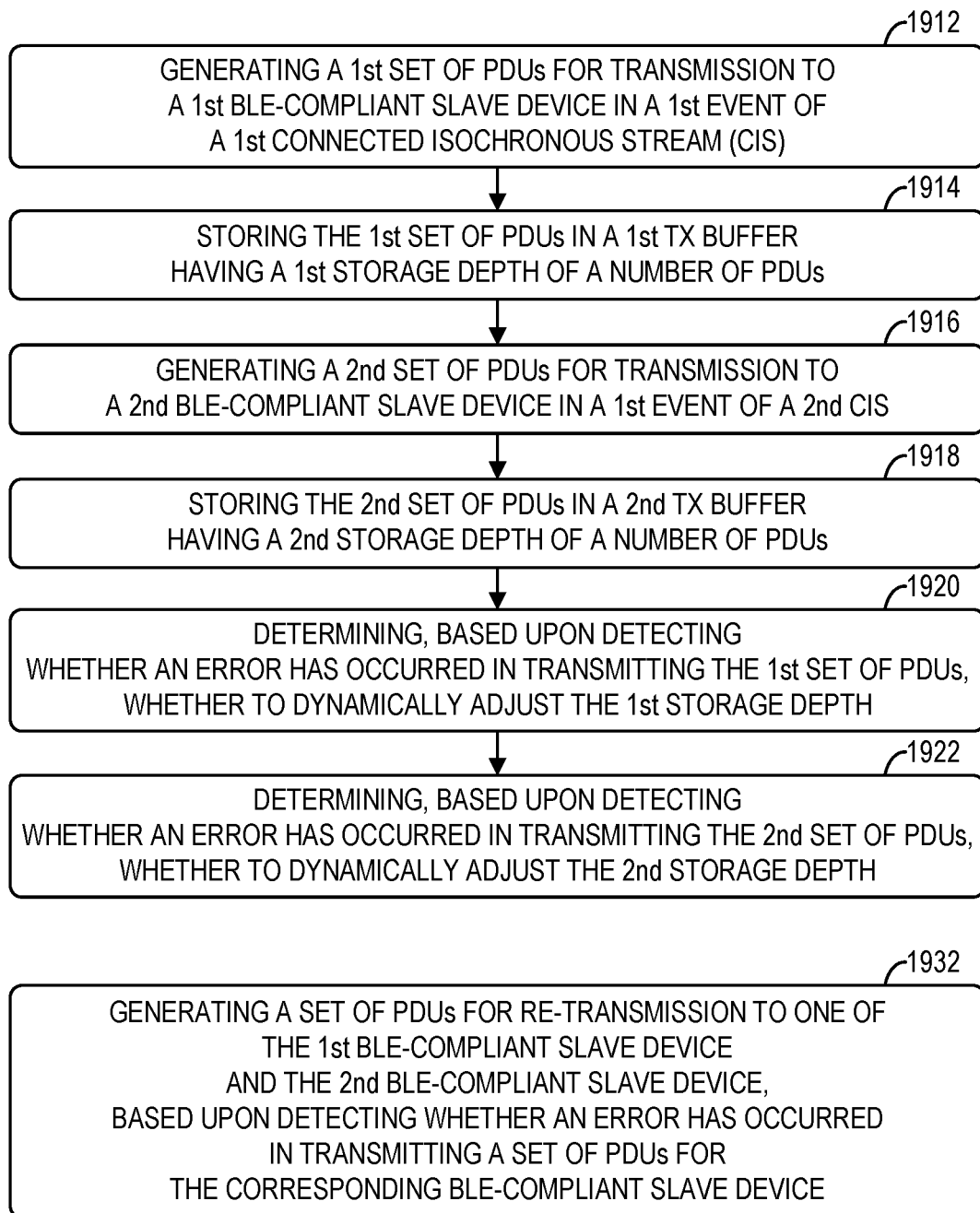
Figure 20:
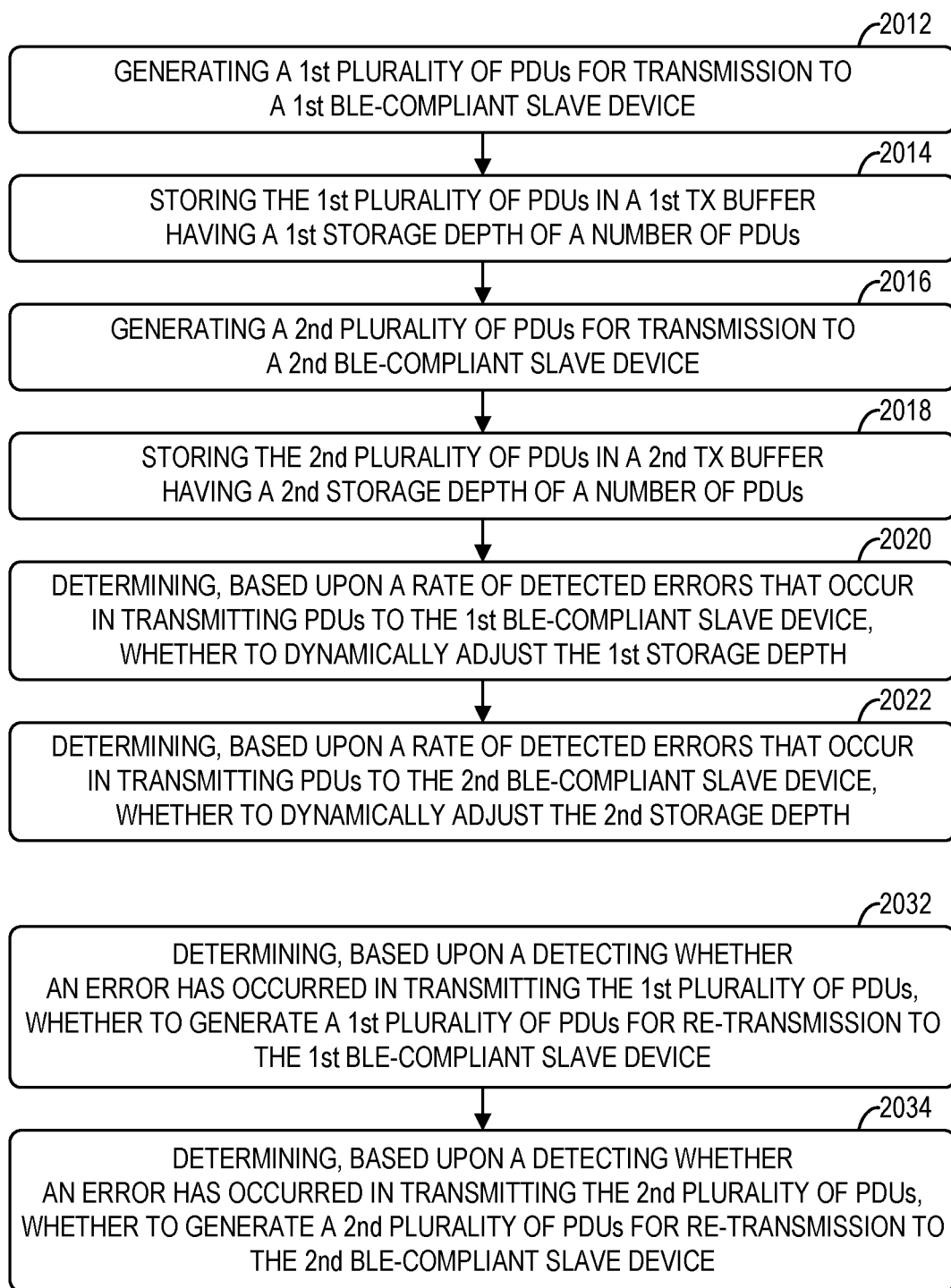
Figure 21:
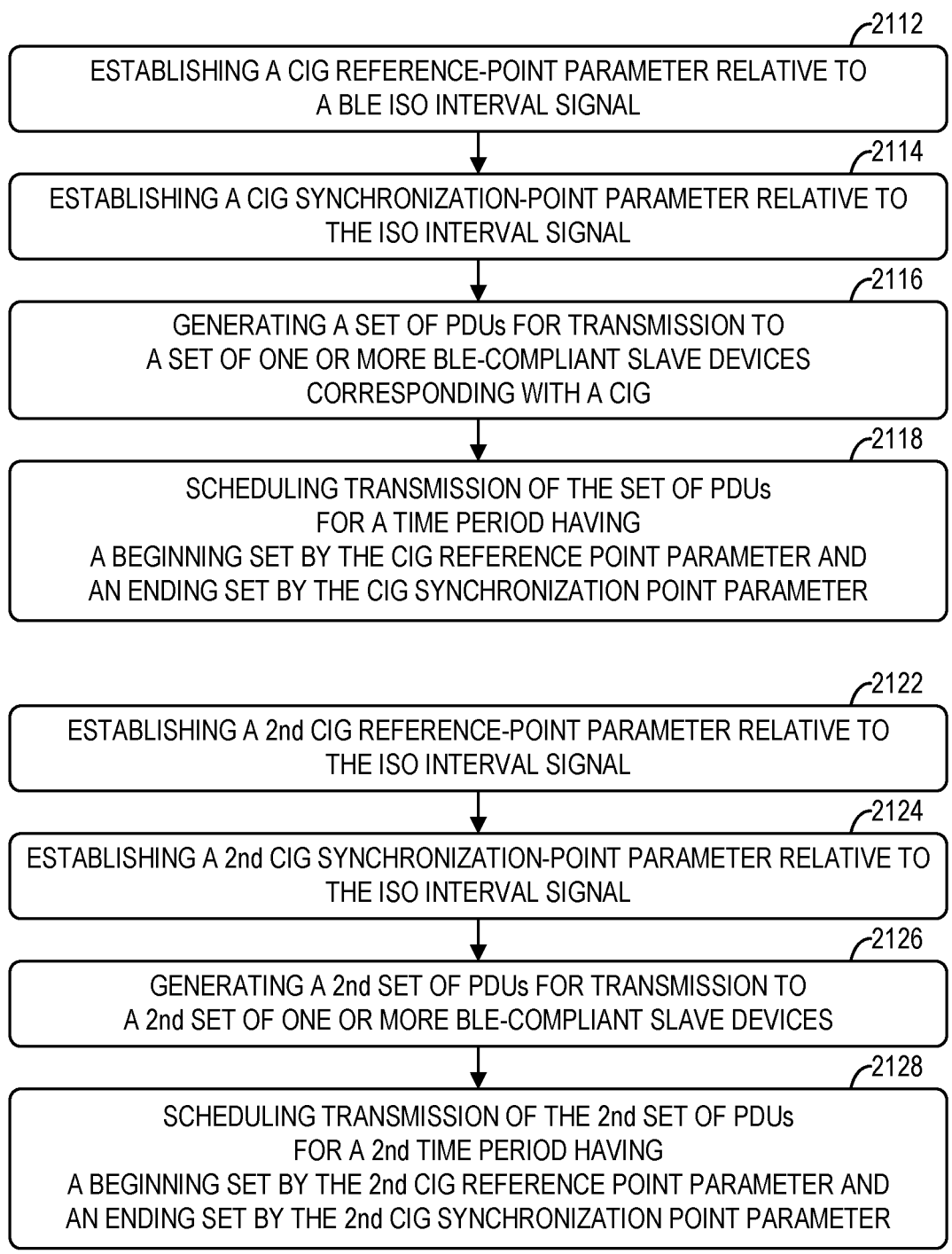
FIGS. 21-23 show example methods for facilitating BLE cross-CIG synchronization, in accordance with one or more embodiments of the present disclosure.
Figure 22:
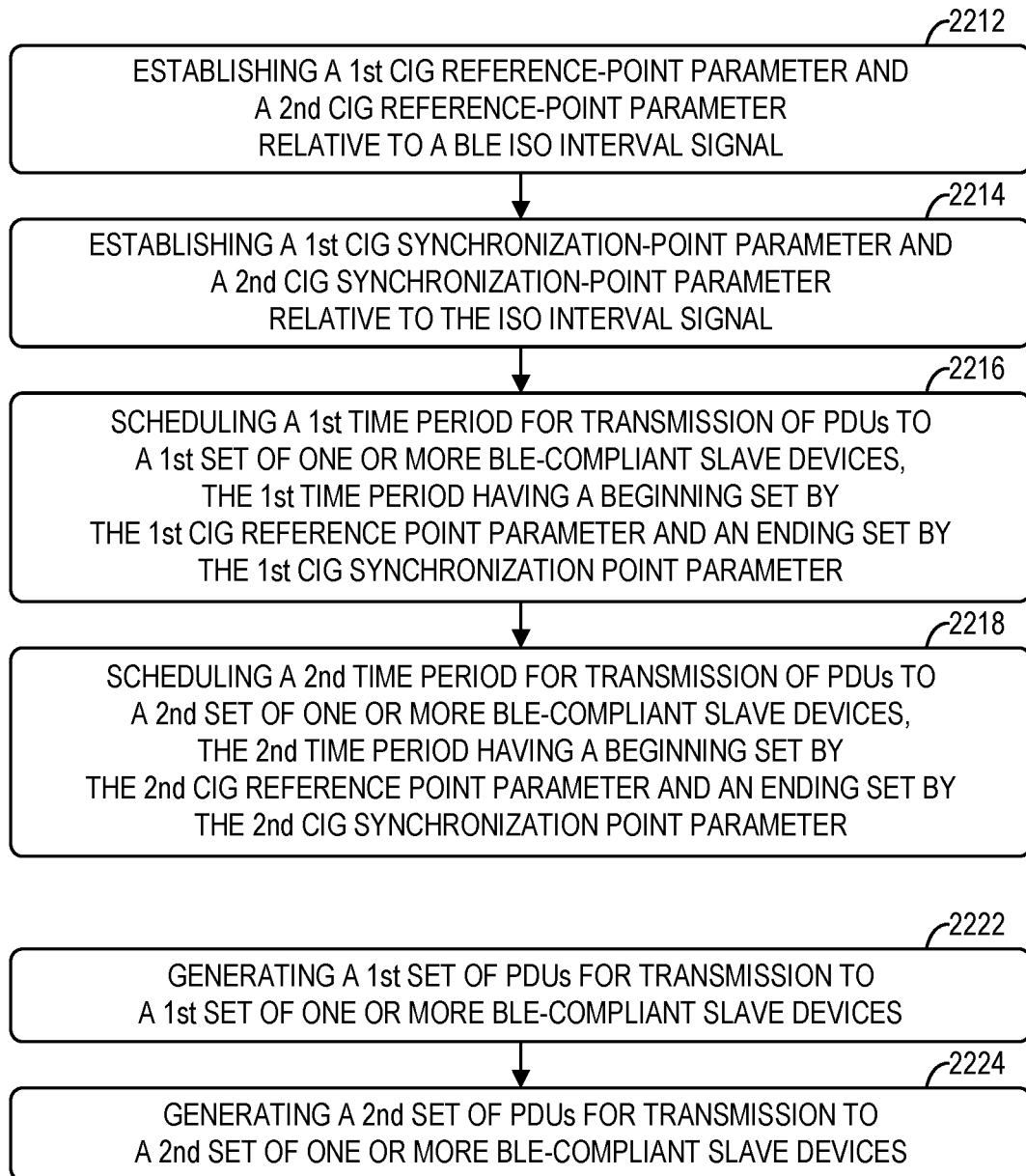
Figure 23:
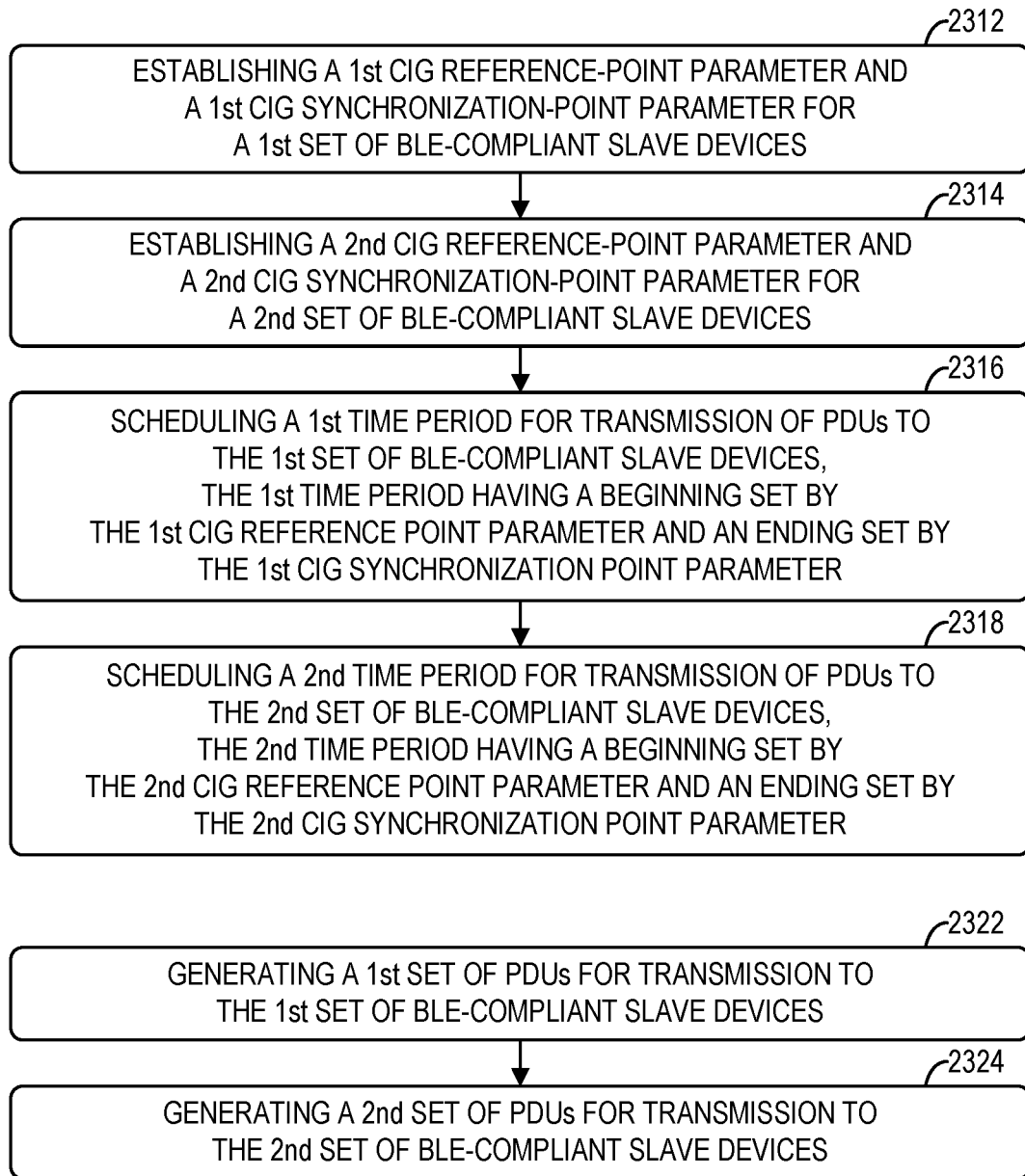

Disclosed herein are mechanisms, systems, and methods for improving data transmission in designs implementing multiple Bluetooth® Low Energy (BLE) connections or BLE links, such as audio transmissions in designs supporting multiple synchronous BLE-based audio devices. These improvements may be applicable for True Wireless Stereo (TWS) systems and other high-fidelity (HI-FI) audio surround systems. FIGS. 1-3 illustrate timing diagrams for BLE-compliant designs that may incorporate multiple BLE slave devices. FIGS. 4 and 5 illustrate timing diagrams and data flow diagrams for BLE-based designs incorporating multiple transmit-side buffers with bandwidth allocation in 10 millisecond (ms) encoder/decoder (CODEC) windows, while FIGS. 6 and 7 illustrate timing diagrams and data flow diagrams for BLE-based designs incorporating multiple transmit-side buffers with bandwidth allocation in 5 ms CODEC windows. FIGS. 8 and 9 show data flow diagrams for BLE-based designs incorporating multiple transmit-side buffers in which the number of transmit-side buffers increases and decreases dynamically. FIG. 10 shows a data flow diagram for BLE-based designs incorporating multiple transmit-side buffers for multiple Connected Isochronous Streams (CISes). FIGS. 11 and 12 pertain to the synchronization of multiple (CIGs). FIGS. 13 and 14 illustrate timing diagrams of scenarios of CIS synchronization. FIGS. 15-17 show example methods for facilitating BLE transmission and synchronization, FIGS. 18-20 show example methods for facilitating BLE dynamic buffer sizing, and FIGS. 21-23 show example methods for facilitating BLE cross-CIG synchronization.

FIG. 1 illustrates a design 100 of BLE isochronous intervals (ISO intervals). Design 100 includes a plurality of CIS events grouped as a CIG with fixed time periods between consecutive CIS anchor points called ISO Intervals 110, in accordance with one or more embodiments of the present disclosure.

A CIS may be a physical time slot enabling connected devices to transfer isochronous data in either direction. Transmission events (e.g., CIS events) occurring among ISO intervals 110 may occur regularly and/or at substantially equal time intervals. A CIG may group a plurality of CISes with a fixed ISO interval, which may be relative to audio CODEC windows.

In design 100, a first CIG event 120 may encompass a first CIS event 122 corresponding with a CIS #1 (e.g., a first CIS) and a first CIS event 124 corresponding with a CIS #2 (e.g., a second CIS), while a second CIG event 140 may encompass a second CIS event 142 corresponding with CIS #1 and a second CIS event 144 corresponding with CIS #2. First CIG event 120 starts at a first anchor point 152 of the earliest CIS event of first CIG event 120 (e.g., first CIS event 122), and second CIG event 140 starts at a second anchor point 154 of the earliest CIS event of second CIG event 140 (e.g., second CIS event 142).

In various embodiments, different CIS events may respectively correspond with transmissions between a BLE master device and different BLE slave devices. For various embodiments, the BLE master device may be a producer or source of audio data for wireless transmission, and the BLE slave devices may be consumers or targets of wirelessly-transmitted audio data.

Some embodiments may include at least a first audio stream (e.g., a mono or stereo audio stream) corresponding with events of CIS #1, and a second audio stream corresponding with events of CIS #2. Moreover, some embodiments may support more than two audio streams. This may be referred to in various embodiments as "stream-based matching."

Other embodiments may employ one single audio channel (e.g., left or right) to match one CIS event. In this case, CIS events may correspond to any of a variety of audio channels (e.g., left and/or right channels, surround channels, left and/or right front channels, left center and/or right center channels, left and/or right surround channels, center channels, subwoofer or low-frequency-effects channels, height channels, and/or location-based configurable channels). Moreover, various embodiments may support any number of audio channels. This may be referred to in various embodiments as "channel-based matching."

As discussed herein, BLE-compliant devices may be devices compliant with low-energy provisions of Revision v5.2 of the Bluetooth® Core Specification.

FIG. 2 illustrates a timing diagram for a scenario 200 in which a BLE-compliant master device transmits to two BLE-compliant slave devices. A BLE master 208 connects with (e.g., is in wireless communication with) both a first BLE slave 202 and a second BLE slave 204. BLE master 208 may transmit various data packages to first BLE slave 202 and second BLE slave 204.

As discussed herein, data packages may contain at least one transmission (e.g., of a BLE NULL packet, a BLE EMPTY packet, and/or a BLE Protocol Data Unit (PDU)). In addition, as disclosed herein, data packages having the same numbering across different CISes may correspond with each other. That is, same-numbered data packages may carry audio data for substantially the same time-slice of a set of streamed audio data.

After first BLE slave 202 and second BLE slave 204 have received the various transmitted data packages, they may transmit Acknowledgements (ACKs) back to BLE master 208 indicating successful receipt of the data packages, or they may transmit Negative Acknowledgements (NAKs) back to BLE master 208 indicating unsuccessful receipt of the data packages. In some cases, BLE master 208 might not receive an ACK or a NAK for a data package (e.g., if a data package is lost or corrupted on the way to first BLE slave 202 or second BLE slave 204). For cases in which BLE master 208 receives a NAK, or for cases in which the ACK or NAK for a data package is missing, BLE master 208 may re-transmit the data package until reaching a flush point.

In various embodiments, data packages discussed herein may be audio packages (e.g., may include audio data), and any BLE packets and/or BLE PDUs they comprise may include audio data (e.g., audio-data payloads). In various embodiments incorporating a plurality of BLE slave devices, a first BLE slave may correspond with a left audio channel (e.g., for a left speaker), and a second BLE slave may correspond with a right audio channel (e.g., for a right speaker).

BLE master 208, first BLE slave 202, and second BLE slave 204 may employ a flush mechanism by which data packages (which may have been corrupt and/or may have incurred data loss) may be discarded, and system underruns may be avoided. BLE master 208 may hold data packages for audio channels, and/or may transmit BLE NULL packets, which may facilitate or enable synchronization of audio data for two audio channels.

For example, as depicted, a CIS #1 (e.g., a first CIS) passing between BLE master 208 and first BLE slave 202 may include a plurality of events respectively corresponding with a plurality of ISO intervals and/or a plurality of CIG events. BLE master 208 may pass PDUs to first BLE slave 202 through CIS #1. A first event of CIS #1 may comprise one or more data packages 222 transmitted from BLE master 208 to first BLE slave 202 and one or more corresponding responses 226 transmitted from first BLE slave 202 to BLE master 208. A second event of the CIS #1 may comprise one or more data packages 242 transmitted from BLE master 208 to first BLE slave 202 and one or more corresponding responses 246 transmitted from first BLE slave 202 to BLE master 208.

Similarly, a CIS #2 (e.g., a second CIS) passing between BLE master 208 and second BLE slave 204 may include a plurality of events respectively corresponding with a plurality of ISO intervals and/or a plurality of CIG events. BLE master 208 may pass PDUs to second BLE slave 204 through CIS #2. A first event of CIS #2 may comprise one or more data packages 224 transmitted from BLE master 208 to second BLE slave 204 and one or more corresponding responses 228 transmitted from second BLE slave 204 to BLE master 208. A second event of CIS #2 may comprise one or more data packages 244 transmitted from BLE master 208 to second BLE slave 204 and one or more corresponding responses 248 transmitted from second BLE slave 204 to BLE master 208.

Regarding the first event of CIS #1, among data packages 222, BLE master 208 transmits a data package P0, for which an ACK is subsequently received among responses 226 before the flush point for data package P0. Following receipt of the ACK for P0, BLE master 208 transmits a data package P1, but an ACK is not immediately received among responses 226. As a result, BLE master 208 re-transmits data package P1 until an ACK for data package P1 is subsequently received among responses 226 before the flush point for data package P1.

Regarding the first event of CIS #2, among data packages 224, BLE master 208 transmits a data package P0, for which an ACK is subsequently received among responses 228 (e.g., before the flush point for data package P0), then transmits a data package P1, for which an ACK is subsequently received among responses 228 (e.g., before the flush point for data package P1). Since BLE master 208 may have no more data packages for the first event of CIS #2, BLE master 208 may then transmit one or more BLE NULL packets before the end of the current ISO interval (for which ACKs are subsequently received among responses 228).

Regarding the second event CIS #1, among data packages 242, BLE master 208 transmits a data package P2, but a NAK (instead of an ACK) is subsequently received for data package P2. As a result, BLE master 208 re-transmits data package P2 until the flush point for data package P2. Following the flush point for data package P2, a flush mechanism may discard data package P2 (e.g., to avoid a system underrun). BLE master 208 then transmits a data package P3, but NAKs (instead of ACKs) are subsequently received for data package P3 as well, resulting in the flush mechanism also discarding data package P3.

Regarding the second event of CIS #2, among data packages 244, BLE master 208 transmits a data package P2, for which an ACK is subsequently received among responses 248 (e.g., before the flush point for data package P2), then transmits a data package P3. However, a NAK (instead of an ACK) is subsequently received for data package P3, and as a result, BLE master 208 re-transmits data package P3 until an ACK for data package P3 is subsequently received among responses 248 (e.g., before the flush point for data package P3). Since BLE master 208 may have no more data packages for the second event of CIS #2, BLE master 208 may then transmit one or more BLE NULL packets before the end of the current ISO interval (for which an ACK is subsequently received among responses 248).

FIG. 3 illustrates a timing diagram for a scenario 300 in which a BLE-compliant master device transmits to BLE-compliant slave devices associated with two CISes, with bandwidth allocation in 10 ms CODEC windows. A BLE master 308 connects with (e.g., is in wireless communication with) both a first BLE slave 302 and a second BLE slave 304. (BLE master 308, first BLE slave 302, and second BLE slave 304 may be substantially similar to BLE master 208, first BLE slave 202, and second BLE slave 204.)

A CIS #1 (e.g., a first CIS) passing between BLE master 308 and first BLE slave 302 may include a first event and a second event. The first event may comprise one or more data packages 322 to first BLE slave 302 and one or more corresponding responses 326 from first BLE slave 302, while the second event may comprise one or more data packages 342 to first BLE slave 302 and one or more corresponding responses 346 from first BLE slave 302.

Similarly, a CIS #2 (e.g., a second CIS) passing between BLE master 308 and second BLE slave 304 may include a first event and a second event. The first event may comprise one or more data packages 324 to second BLE slave 304 and one or more corresponding responses 328 from second BLE slave 304, while the second event may comprise one or more data packages 344 to second BLE slave 304 and one or more corresponding responses 348 from second BLE slave 302.

The events of CIS #1 and/or CIS #2 may allocate extra bandwidth for re-transmission of PDUs. Under normal conditions, BLE master 308 may send out NULL packets in such extra bandwidth (e.g., for synchronization). Upon data loss or corruption, BLE master 308 may make use of that extra bandwidth to re-transmit PDUs. A data loss or corruption condition may be deemed to have occurred upon receipt of a NAK for a data package, or upon the lack of receipt of either an ACK or a NAK for a data package (e.g., within a certain expected window of time).

In various embodiments, further CIS events may pass between BLE master 308 and other BLE slave devices. For example, events of a CIS #3 (e.g., a third CIS, which may correspond with, for example, a subwoofer audio channel) may pass between BLE master 308 and a third BLE slave device.

Scenario 300 depicts a bandwidth allocation corresponding with a 10 ms ISO interval, with BLE master 308 adapting a 10 ms CODEC window and 192 bits per second (bps) per channel. BLE master 308 may be disposed to sending one packet (e.g., including a PDU and Header) with 240+11 bytes in 10 ms. (Note that (192000/1000)/8 corresponds with about 24 bytes in 1 ms). A packet duration may be about 0.98 ms on a 2.048 megahertz (MHz) physical layer (PHY). An ACK PDU and Header may contain up to 11 bytes, which may be equal to about 0.04 ms. Total data exchange may be 1.02 ms, but an actual period may be disposed to using 1.25 ms as a base unit.

A flush point may be set after another two 1.25 ms cycles due to two time slots of possible re-transmission in scenario 300. However, this re-transmission might not work well due to using the same radio frequency (RF) channel. Since a large part of data corruption may be caused by packet collisions on the same RF channel, it is very possible that data corruption may happen again on a re-transmitted packet. Moreover, there are reasons that using different RF channels for re-transmission may be disadvantageous. Unlike Bluetooth® Classic systems in which hopping may be done every 0.625 ms, for designs compliant with Revision 5.2 of the Bluetooth® core specification, an algorithm for BLE channel selection in a CIS event may cause data transmissions to hop to another RF channel and avoid continuous collisions after one event is done. However, during a CIS event, the algorithm may cause data transmissions to remain on the same RF channel, and re-transmission collision on the same channel may therefore not be avoided.

An alternative solution may be to create three sub-events to permit more hopping and avoidance of collision on the same RF channel. However, sub-events might be used to support different audio signals (e.g., mixing signals), not for hopping to support re-transmission. Furthermore, additional hopping might entail more settling time, which may then reduce a transmission bandwidth.

FIG. 4 illustrates a timing diagram for a scenario 400 in which a BLE-compliant master device 408 carries out a sending run and a CODEC run for two CISes, with bandwidth allocation in 10 ms CODEC windows. A BLE master 408 connects with (e.g., is in wireless communication with) a first BLE slave and a second BLE slave. (BLE master 408, the first BLE slave, and the second BLE slave may be substantially similar to BLE master 308, first BLE slave 302, and second BLE slave 304.)

A CIS #1 (e.g., a first CIS) passing between BLE master 408 and the first BLE slave may include an event comprising one or more data packages 422 to the first BLE slave, and a CIS #2 (e.g., a second CIS) passing between BLE master 408 and the second BLE slave may include an event comprising one or more data packages 424 to the second BLE slave. Scenario 400 may employ an ISO interval of 10 ms, and events within the ISO interval may span 3.75 ms.

In scenario 400, extra buffers (e.g., rendering buffers) may be added for extra data packages (e.g., on the transmit side), and may provide a more complete synchronization mechanism. Some latency may advantageously be traded off to fill up the extra buffers and keep a high quality of rendering. Larger buffer sizes may advantageously reduce the risk or incidence of audio lacking—e.g., the risk of loss of audio data due to transmission errors that are unable to be corrected by re-transmission—at the expense of added latency.

Based on system design considerations, an initial buffer size may be determined. For example, in the case of scenario 300 of FIG. 3, the initial buffer size may be set to three, which may add 30 ms of extra latency.

In real processing, data cycles may be divided into "CODEC runs" (to encode to buffers and/or decode from buffers) and "sending runs" (to send data out via BLE RF channels). For example, in a first sending run 462, data from a first event of CIS #1 may be sent out via a BLE RF channel, and in a first CODEC run 464, data from the first event CIS #1 may be encoded to buffers and/or decoded from buffers. Similarly, in a second sending run 482, data from a first event of CIS #2 may be sent out via a BLE RF channel, and in a second CODEC run 484, data from the first event of CIS #2 may be encoded to buffers and/or decoded from buffers.

Scenario 400 may be additionally understood in the context of FIG. 5, which shows a data flow diagram of a scenario 500 in which data packages flow from three transmit-side (TX) buffers 508 to three receive-side (RX) buffers 502 across a plurality of events for one CIS, with 10 ms CODEC windows. (Although the data flow diagrams disclosed herein may depict three TX buffers 508 and three RX buffers 502, in various embodiments, other numbers of TX buffers and RX buffers may be employed.)

For a first event 510, in a first CODEC run before the first sending run, a BLE master (e.g., BLE master 408) may fill up TX buffers 508 with three data packages P1, P2, and P3 (and may incur a delay of 30 ms to do so). In a first sending run, the BLE master may then send out data packages P1, P2, and P3 to a BLE slave that connects with (e.g., is in wireless communication with) the BLE master (such as any of the various BLE slaves discussed herein), which may in turn store data packages P1, P2, and P3 in RX buffers 502. The BLE slave may then acknowledge receipt of data packages P1, P2, and P3 to the BLE master, and corresponding space in TX buffers 508 may be cleared.

For a second event 520, in a second CODEC run, the BLE slave may "play" (or consume) a data package P1 from RX buffers 502, while the BLE master fills one of TX buffers 508 with a data package P4. In a second sending run, the BLE master may then send out data package P4 to the BLE slave, which may in turn store data package P4 in RX buffers 502. The BLE slave may then acknowledge receipt of data package P4 to the BLE master, and corresponding space in TX buffers 508 may be cleared.

For a third event 530, in a third CODEC run, the BLE slave may play a data package P2 from RX buffers 502, while the BLE master fills one of TX buffers 508 with a data package P5. In a third sending run, the BLE master may then send out data package P5 to the BLE slave. However, data package P5 is lost or corrupted, and the BLE slave does not acknowledge receipt of data package P5 to the BLE master. Accordingly, data package P5 is not yet cleared from TX buffers 508 (and does not go on to fill up RX buffers 502).

For a fourth event 540, in a fourth CODEC run, the BLE slave may play a data package P3 from RX buffers 502, while the BLE master fills one of TX buffers 508 with a data package P6. In a fourth sending run, the BLE master may then send out data package P5 to the BLE slave again (i.e., the BLE master may re-transmit data package P5 to the BLE slave). However, data package P5 is lost or corrupted again, and the BLE slave still does not acknowledge receipt of data package P5 to the BLE master. Accordingly, data package P5 is still not yet cleared from TX buffers 508.

For a fifth event 550, in a fifth CODEC run, the BLE slave may play data package P4 from RX buffers 502 (thus clearing RX buffers 502), while the BLE master fills one of TX buffers 508 with a data package P7. In a fifth sending run, the BLE master may then send out data package P5 to the BLE slave yet again. However, data package P5 is lost or corrupted yet again, and the BLE slave still does not acknowledge receipt of data package P5. In order to make room for the next data package, data package P5 (e.g., the oldest data package in TX buffers 508) will be flushed out of TX buffers 508.

For a sixth event 560, in a sixth CODEC run, the BLE master fills in the freed-up TX buffer and thus fills up TX buffers 508. In a sixth sending run, the BLE master may then send out data packages P6, P7, and P8 to the BLE slave, which may in turn store data packages P6, P7, and P8 in RX buffers 502. The BLE slave may then acknowledge receipt of data packages P6, P7, and P8 to the BLE master, and corresponding space in TX buffers 508 may be cleared. The flow of data packages now resembles the flow of data packages in event 1.

In scenario 500, since data package P5 is not received by the BLE slave, an audio lacking occurs. Although the structures and methods discussed herein may not eliminate this possibility, they may advantageously reduce its probability. In many cases, re-transmission should succeed in next cycle, and a subsequent sending run may then catch up and fill one or two more data packages to RX buffers 502. Compared to the flow of data packages without extra buffers, the structures and methods discussed herein may advantageously result in an effective increase of the flush point from 2 data packages to 8 data packages. Moreover, three events may be on different wireless channels. Accordingly, the structures and methods discussed herein may advantageously minimize the possibility of data lacking.

FIG. 6 illustrates a timing diagram for a scenario in which a BLE-compliant master device transmits to two BLE-compliant slave devices, with bandwidth allocation in 5 ms CODEC windows. A BLE master 608 connects with (e.g., is in wireless communication with) a first BLE slave 602 and a second BLE slave 604. (BLE master 608, first BLE slave 602, and second BLE slave 604 may be substantially similar to other BLE masters, first BLE slaves, and second BLE slaves discussed herein.)

A CIS #1 (e.g., a first CIS) passing between BLE master 608 and first BLE slave 602 may include a first event and a second event. The first event may comprise one or more data packages 622 transmitted to first BLE slave 602 and one or more corresponding responses 626 transmitted from first BLE slave 602, while the second event may comprise one or more data packages 642 transmitted to first BLE slave 602 and one or more corresponding responses 646 transmitted from first BLE slave 602. Scenario 600 may employ an ISO interval of 5 ms, and the events of CIS #1 and CIS #2 may span 1.25 ms.

Similarly, a CIS #2 (e.g., a second CIS) passing between BLE master 608 and second BLE slave 604 may include a first event and a second event. The first event may comprise one or more data packages 624 transmitted to second BLE slave 604 and one or more corresponding responses 628 transmitted from second BLE slave 604, while the second event may comprise one or more data packages 644 transmitted to second BLE slave 604 and one or more corresponding responses 648 transmitted from second BLE slave 602.

Re-transmission of data packets may occur within events of CIS of #1 and events of CIS #2, if necessary (e.g., upon determinations that a data loss or corruption condition has occurred, due to receipt of a NAK for a data package, or the lack of a receipt of either an ACK or a NAK for a data package).

Scenario 600 depicts a bandwidth allocation corresponding with a 5 ms ISO interval, with BLE master 608 adapting a 5 ms CODEC window and 128 bps per channel. In this case, extra latency can be improved from 30 ms to 15 ms by using three buffers. Meanwhile, there is merely one retransmission bandwidth in this case, but one extra data package may be transmitted every event and may then fill up RX buffers in two events.

Scenario 600 may advantageously have better latency and smaller data packages. Smaller data itself may also advantageously reduce the possibility of corruption. Implementation of a Low Complexity Communication (LC3) CODEC may still be able to provide very good quality in 128 bps (although the bit rate may be lower). Bandwidth application maps may advantageously be designed to match quality targets in various embodiments.

Scenario 600 may be additionally understood in the context of FIG. 7, which shows a data flow diagram of a scenario 700 in which data packages flow from three TX buffers 708 to three RX buffers 702 across a plurality of events for one CIS, with 5 ms CODEC windows. For a first event 710, in a first CODEC run before the first sending run, a BLE master (e.g., BLE master 608) may fill up TX buffers 708 with three data packages P1, P2, and P3 (and may incur a delay of 15 ms to do so). In a first sending run, the BLE master may then send out data packages P1 and P2 to a BLE slave that connects with (e.g., is in wireless communication with) the BLE master (such as any of the various BLE slaves discussed herein), which may in turn store data packages P1 and P2 in RX buffers 702. The BLE slave may then acknowledge receipt of data packages P1 and P2 to the BLE master, and corresponding space in TX buffers 708 may be cleared.

For a second event 720, in a second CODEC run, the BLE slave may play a data package P1 from RX buffers 702, while the BLE master fills one of TX buffers 708 with a data package P4. In a second sending run, the BLE master may then send out data packages P3 and P4 to the BLE slave, which may in turn store data packages P3 and P4 in RX buffers 702. The BLE slave may then acknowledge receipt of data packages P3 and P4 to the BLE master, and corresponding space in TX buffers 708 may be cleared.

For a third event 730, in a third CODEC run, the BLE slave may play a data package P2 from RX buffers 702, while the BLE master fills one of TX buffers 708 with a data package P5. In a third sending run, the BLE master may then send out data package P5 to the BLE slave, which may in turn store data package P5 in RX buffers 702. The BLE slave may then acknowledge receipt of data package P5 to the BLE master, and corresponding space in TX buffers 708 may be cleared.

FIG. 8 shows a data flow diagram of a scenario 800 in which data packages flow through a set of TX buffers and a set of RX buffers across a plurality of events for one CIS, with the number of buffers increasing dynamically. In comparison with the timing diagram for scenario 300, the data flow of scenario 800 shows increased flexibility. In comparison with the data flow diagram of scenario 500, which has a fixed number of TX buffers, the more-flexible functionality of scenario 800 may include a dynamic increase in the number of TX buffers and RX buffers across a plurality of events for CISes, to advantageously improve audio quality.

A system may be configured for a data flow across two TX buffers and two RX buffers, which may correspond to minimum latency and acceptable audio quality initially, and normal operation may commence as in scenario 500. Subsequently, a count of how many times a flush, data loss, and/or data corruption has happened, or has not happened, may be accumulated for a period of time (which may be predetermined, or configurable). If the count exceeds a threshold value within that period of time, a determination that corruption is happening too often may be made. The BLE master may then increment the number of TX buffers (e.g., by one, or by another amount). The BLE salve might not be informed of the increase in the number of TX buffers. Instead, the BLE slave may merely passively follow the BLE master to receive whatever data may be available in the data flow.

After a number of events (not depicted), by the time an event 850 occurs, as of a CODEC run, the BLE master has two TX buffers 808 for the data flow, which are filled up with two data packages P5 and P6. In a sending run, the BLE master may then send out at least a data package P5 to a BLE slave. However, data package P5 is lost or corrupted, and the BLE slave does not acknowledge receipt of data package P5. Accordingly, data package P5 is not yet cleared from TX buffers 808.

Subsequently, for an event 860, in a CODEC run, the BLE master fills in the newly-added TX buffer with a data package P7—without flushing data package P5 out of TX buffers 808—and thus fills up TX buffers 808. In a sending run, the BLE master may then send out data packages P5, P6, and P7 to the BLE slave, which may in turn store data packages P5, P6, and P7 in RX buffers 802. The BLE slave may then acknowledge receipt of data packages P5, P6, and P7 to the BLE master, and corresponding space in TX buffers 808 may be cleared. The system may go back to normal sending and receiving, with buffers increased by one, which may advantageously dynamically reduce a rate of flush-out and/or improve audio quality (although at the expense of potential latency increase).

In comparison with scenario 500, the BLE master may get rid of data package P5, move data package P6 ahead, and enqueue new data package P7 for the next sending run. Instead of flushing out P5, the BLE master may increase a size of TX buffers 808 to three and put data package P7 on the latest queue. Once the network is back to normal, in event 860, the BLE master may immediately send out three data packages and increase a size of RX buffers 802 to three. Scenario 800 may accordingly add a dynamic buffer-increasing feature to scenario 500.

Although the structures and methods may not eliminate the possibility of an audio lacking in event 860 (or a subsequent event), they may advantageously reduce its probability. Moreover, incrementing TX buffers 808 and/or RX buffers 802 may eliminate audio lacking in event 850, which may advantageously permit an increase in latency for a reduction in overall audio lacking.

FIG. 9 shows a data flow diagram of a scenario 900 in which data packages flow through a set of TX buffers and a set of RX buffers across a plurality of events for one CIS, with the number of buffers decreasing dynamically. In comparison with the timing diagram for scenario 300, the data flow of scenario 900 shows increased flexibility. In comparison with the data flow diagram of scenario 500, which has a fixed number of TX buffers, the more-flexible functionality of scenario 900 may include a dynamic decrease in the number of TX buffers and RX buffers across a plurality of events for CISes to advantageously improve latency.

A system may be configured for a data flow across three TX buffers and three RX buffers, which may correspond to higher latency and reduced audio-lacking, and normal operation may commence as in scenario 500. Subsequently, a count of how many times a flush, data loss, and/or data corruption (e.g., an error) has happened, or has not happened, may be accumulated for a period of time (which may be predetermined, or configurable). If a period of no errors continues and the count reaches a threshold value, a determination that corruption is happening sufficiently-rarely may be made. The BLE master may then decrement the number of TX buffers (e.g., by one, or by another amount) to improve latency.

After a number of events (not depicted), by the time an event 950 occurs, as of a CODEC run, the BLE master has three TX buffers 908 for the data flow, and two data packages P5 and P6 currently reside in RX buffers 902. As of event 950, the BLE master may have counted no errors, and an internal timer may have reached a threshold value, which may in turn trigger an automatic buffer reducing process. In some embodiments, the count of how many times a flush, data loss, and/or data corruption has happened may continue to be accumulated for a period of time (which may be predetermined, or configurable). If a flush, data loss, and/or data corruption has happened fewer than a threshold number of times within that period of time, a determination that corruption is happening sufficiently rarely may be made. The BLE master may then decrement the number of TX buffers (e.g., by one, or by another amount). The BLE slave might not correspondingly decrement the number of RX buffers, and may instead merely passively make use of fewer existing RX buffers than had previously been used when the range of TX buffers was larger.

For fifth event 950, in the CODEC run, the BLE master (e.g., BLE master 408) may flush out a data package P7 from TX buffers 908 (or may not place data package P7 into TX buffers 908). In a sending run, the BLE master may then refrain from sending out any data packages, and may decrement the number of TX buffers to two.

Subsequently, for an event 960, in a CODEC run, the BLE slave may play a data package P5 from RX buffers 902, while BLE master fills one of TX buffers 908 with a data package P8. In a sending run, the BLE master may then send out data package P8 to the BLE slave, which may in turn store data package P8 in RX buffers 902. The BLE slave may then acknowledge receipt of data package P8 to the BLE master, and corresponding space in TX buffers 908 may be cleared. The system may then be back to normal sending and receiving, with buffers decreased by one, which may advantageously dynamically In scenario 500, the BLE master may continue to send out data package P7 and may enqueue data package P7 to a next RX buffer. In contrast, in scenario 900, the BLE master may instead flush out data package P7 and send one or more NULL packets in the sending run of event 950. Then, starting from event 960, the BLE master might merely fill two TX buffers. Since the RX side will have already incurred a lost or corrupted data package in a previous event, the BLE slave may automatically follow the BLE master side and reduce its RX buffer size to two. After event 960, all transactions in the data flow may return to scenario 500 with two TX and RX buffers. Scenario 900 may accordingly add a dynamic buffer-decreasing feature to scenario 500, which may advantageously improve latency. However, a system implementing scenario 500 may be disposed to finding a suitable time (e.g., a silent audio period) to exercise the dynamic buffer-decreasing feature and maintain maximum audio quality.

FIG. 10 shows a data flow diagram of a scenario 1000 in which synchronized data packages flow through a plurality of TX buffers and a plurality of RX buffers across a plurality of events for two CISes. In scenario 1000, a CIS #1 (e.g., a first CIS) and a CIS #2 (e.g., a second CIS) may have been in operation in a manner substantially similar to scenario 500 and/or scenario 700 (possibly also including the dynamic buffer-increasing of scenario 800 and/or dynamic buffer-decreasing of scenario 900). A first BLE slave may have established CIS #1 with a BLE master and may have a set of first RX buffers 1002, and a second BLE slave may have established CIS #2 with the BLE master and may have a set of second RX buffers 1004. The BLE master may in turn have a set of first TX buffers 1006 corresponding with first RX buffers 1002 and a set of second TX buffers 1008 corresponding with second RX buffers 1004.

For an event 1032 of CIS #1, in a CODEC run, the first BLE slave may play a data package P2 (not depicted) from first RX buffers 1002, while the BLE master fills a corresponding first TX buffer 1006 with a data package P5. In a sending run, the BLE master may then send out data package P5 to the first BLE slave, which may in turn store data package P5 in first RX buffers 1002 (e.g., in accordance with scenario 500 and/or scenario 700). The first BLE slave may then acknowledge receipt of data package P5 to the BLE master, and corresponding space in first TX buffers 1006 may be cleared.

Then, for an event 1034 of CIS #2, in a CODEC run, the second BLE slave may play a data package P2 (not depicted) from second RX buffers 1004, while the BLE master fills a corresponding first TX buffer 1006 with a data package P5. In a sending run, the BLE master may then send out data package P5 to the second BLE slave. However, data package P5 is lost or corrupted, and the second BLE slave does not acknowledge receipt of data package P5 to the BLE master. Accordingly, data package P5 is not yet cleared from the corresponding second TX buffer 1008 (and does not go on to fill up second RX buffers 1004).

For a next event 1042 of CIS #1, in a CODEC run, the first BLE slave may play a data package P3 from first RX buffers 1002, while the BLE master fills a second TX buffer 1008 with a data package P6. In a fourth sending run, if the BLE master were following scenario 500 and/or scenario 700, it might send data package P6 to the first BLE slave. However, in scenario 1000, the BLE master may be disposed to determine whether second TX buffers 1008 (for CIS #2) are at the same state (e.g., at the same data package) and/or are in sync. Since second TX buffers 1008 still have one pending data package (P5), the BLE master may in response hold the transmission of P6 from first TX buffers 1006, in order to make synchronize the state of both CISes.

Then, for a next event 1044 of CIS #2, in a CODEC run, the second BLE slave may play data package P3 from second RX buffers 1004, while the BLE master fills a corresponding second TX buffer 1008 with data package P6. In a fourth sending run, the network may recover, and the of CIS #2 to the second BLE slave, which may in turn store data packages P5 and P6 in second RX buffers 1004. The second BLE slave may then acknowledge receipt of data packages P5 and P6 to the BLE master, and corresponding space in second TX buffers 1008 may be cleared.

For a next event 1052 of CIS #1, in a CODEC run, the first BLE slave may play a data package P4 from first RX buffers 1002, while the BLE master fills a first TX buffer 1006 with a data package P7. In a sending run, the BLE master may have determined that second TX buffers 1008 (for CIS #2) have been cleared. Based on that determination, the BLE master may then stop holding transmissions, send out data package P6 and data package P7 to first RX buffers 1002, and may place CIS #1 and CIS #2 in the same state (and/or in sync again). The first BLE slave may then acknowledge receipt of data packages P6 and P7 to the BLE master, and corresponding space in first TX buffers 1006 may be cleared.

Then, for a next event 1054 of CIS #2, in a codec run, the second BLE slave may play data package P4 from second RX buffers 1004, while the BLE master fills a second TX buffer 1008 with data package P7. In a sending run, the BLE master may then send out data package P7 to the second BLE slave, which may in turn store data package P7 in second RX buffers 1004. The second BLE slave may then acknowledge receipt of data package P7 to the BLE master, and corresponding space in the corresponding TX buffers 1008 may be cleared. In other words, for next event 1054, the second BLE slave may be back to a normal state and may merely send out data package P7 in a regular manner.

By adding checking, holding, and catch-up sending as described and depicted herein, the design of scenario 1000 may advantageously add a synchronization mechanism between multiple CISes to the design of scenario 500 and/or scenario 700.

Accordingly, in scenarios having more than one stream of CIS event—e.g., for more than one BLE slave—the various streams may can send out data packages in sequence. In the event of lost or corrupted data sent to one BLE slave, the sending of corresponding data packages may be held for the remaining BLE slaves, and may thereby advantageously keep all data streams synchronized. A BLE master may transmit one or more BLE NULL packets while holding up the transmission of data packages until the lost data package may be successfully re-transmitted (or until the lost data package is flushed).

FIG. 10 depicts synchronization between dual CISes. However, the methods and mechanisms discussed and depicted herein may be extended and applied to three CISes, or any number of CISes (e.g., with one CIS per BLE slave device), so long as the transmission parameters can accommodate those CISes. For example, the methods and mechanisms discussed and depicted herein may be extended to a JBL® Bar 5.1 sound bar based systems.

Moreover, in various embodiments, multiple CIGs—each of which may encompass multiple CISes—may be synchronized, as discussed below regarding FIGS. 11 and 12. FIG. 11 illustrates a relationship between multiple CIGs. A first CIG 1110—e.g., a CIG #1—may encompass a set or series of events for a CIS #1 (e.g., a first CIS) of CIG #1, a CIS #2 (e.g., a second CIS) of CIG #1, and so on, through a CIS #N (e.g., an Nth CIS) of CIG #1. Similarly, a first CIG 1120—e.g., a CIG #2—may encompass a set or series of events for a CIS #1 (e.g., a first CIS) of CIG #2, a CIS #2 (e.g., a second CIS) of CIG #1, and so on, through a CIS #N (e.g., an Nth CIS) of CIG #2.

This may be extended through any number of CIGs, through an Mth CIG 1190—e.g., a CIG #M—which may encompass a set or series of events for a CIS #1 (e.g., a first CIS) of CIG #M, a CIS #2 (e.g., a second CIS) of CIG #M, and so on, through a CIS #N (e.g., an Nth CIS) of CIG #M. Various embodiments of the mechanisms and methods discussed herein may accordingly encompass any number of CIGs, each of which may encompass any number of CISes.

The CIGs (and CISes) of FIG. 11 may be served by the structures of FIG. 12, which illustrates a BLE master device 1202 connected with various BLE slave devices. BLE master device 1202 may comprise a Central Processing Unit (CPU)/Digital Signal Processor (DSP) device 1204. In turn, BLE master device 1204 may include a first BLE circuitry 1212, a second BLE circuitry 1222, and so on, up through an Mth BLE circuitry 1292.

First BLE circuitry 1212 may correspond with a CIG #1 (e.g., a first CIG), second BLE circuitry 1222 may correspond with a CIG #2 (e.g., a second CIG), and so on, up through Mth BLE circuitry 1292, which may correspond with a CIG #M (e.g., an Mth CIG). First BLE circuitry 1212 may connect with (e.g., be in wireless communication with) a set of first BLE slave devices 1214 (which may include any number of BLE slave devices) that respectively correspond with a set of CISes. Similarly, second BLE circuitry 1222 may connect with a set of second BLE slave devices 1224 that respectively correspond with a set of CISes, and so on, up through Mth BLE circuitry 1292, which may connect with a set of Mth BLE slave devices 1294.

FIG. 13 illustrates a timing diagram of a scenario 1300 of clock synchronization among CIGs. In scenario 1300, on the BLE master side, a main CPU/DSP component (which may be substantially similar to main CPU/DSP device 1204) may be coupled to a first BLE RF component 1302 and a second BLE RF component 1304 (which may be substantially similar to first BLE circuitry 1212 and second BLE circuitry 1222, for example). The BLE master device may then connect with (e.g., be in wireless communication with) a set of various BLE slave devices in corresponding CISes (grouped as CIG #1) through first BLE RF component 1302, and may connect with (e.g., be in wireless communication with) a set of various other BLE slave devices in corresponding CISes (grouped as CIG #2) through second BLE RF component 1304.

The main CPU/DSP component may generate a series of fixed ISO Interval pulses 1310 on general purpose input/output (GPIO) pins connecting with first BLE RF component 1302 and second BLE RF component 1304, for making all CIG events synchronized. Each of first BLE RF component 1302 and second BLE RF component 1304 may have a different clock (e.g., clock signal), and first BLE RF component 1302 and second BLE RF component 1304 may have clock counters. First BLE RF component 1302 and second BLE RF component 1304 may capture values of their clock counters on rising edges of ISO Interval pulses 1310, and may match them to a common CIG synchronization point. Similarly, first BLE RF component 1302 and second BLE RF component 1304 may capture values of their clock counters on falling edges of ISO Interval pulses 1310, and may match them to a common CIG reference point.

As depicted, a first ISO-Interval pulse 1310 may occur, and a clock offset parameter ("CIG-Sync-Delay") for first BLE RF component 1302 may be set, based on the CIG reference point of first BLE RF component 1302. Similarly, a second ISO-Interval pulse 1310 may occur, and a CIG-Sync-Delay parameter for second BLE RF component 1304 may be set, based on the CIG reference point of second BLE RF component 1304. The CIG-Sync-Delay parameters may be established to make a CIG synchronization point for first BLE RF component 1302 and a CIG synchronization point for second BLE RF component 1304 happen at the same time. Once CIG synchronization points have been set, a fixed clock offset parameter ("CIS-Sync-Delay") may be set from the CIG synchronization point to make all CIS anchor points happen at the same time. For example, based upon Revision v5.2 of the Bluetooth® Core Specification, a system may be disposed to align CIGx_sync_delay values inside a period between synchronization and reference points (e.g., between CIGs). By matching individual clock counter values to ISO Interval pulses 1310 and by setting their own sync delay values, a system based on the timing diagram of scenario 1300 may advantageously synchronize clocks of both first BLE RF component 1302 and second BLE RF component 1304.

Besides clock synchronization of CIGs, FIG. 14 illustrates a timing diagram of a scenario 1400 of CIG payload synchronization of two BLE RF components. A main CPU/DSP component 1408 may be coupled to a first BLE RF component 1402 and a second BLE RF component 1404 (which may be substantially similar to the main CPU/DSP component, first BLE RF component 1302, and second BLE RF component 1304 of scenario 1300, respectively).

As with scenario 1300, a GPIO pin of main CPU/DSP component 1408 may be used to carry fixed ISO-Interval pulses 1410 to sync clocks among CIGs. After (e.g., when all CIS anchor points will happen at the same time) the transmissions of all CIGs (including grouped CISes) have been synchronized (e.g., when all CIS anchor points will happen at the same time), main CPU/DSP component 1408 may begin to send data to first BLE RF component 1402 and second BLE RF component 1404 (and any other BLE chips) 14 without a large offset. Subsequently, transaction status may be synchronized in accordance with scenario 1000.

In scenario 1400, additional GPIO pins (e.g., aside from the GPIO pin carrying ISO-Interval pulses 1410) may be connected. A sending GPIO 1420 generated by main CPU/DSP 1408 may inform first BLE RF component 1402 and second BLE RF component 1404 of a number of PDU buffers may be sent out in an ISO period. Once PDUs are successfully sent out from first BLE RF component 1402 and have received ACKs, first BLE RF component 1402 may respond back to main CPU/DSP component 1408 with corresponding pulses on a first ACK GPIO 1430. Once PDUs are successfully sent out from second BLE RF component 1404 and have received ACKs, second BLE RF component 1404 may respond back to main CPU/DSP component 1408 with corresponding pulses on a second ACK GPIO 1440. FIG. 14 depicts an example of this sequence with three buffers.

Main CPU/DSP component 1408 may collect all ACK status from first BLE RF component 1402 and second BLE RF component 1404 and may indicate how many data packages (which may, e.g., comprise PDUs) are sent out via pulses on sending GPIO 1420 in a subsequent ISO period. First BLE RF component 1402 may then respond with the same number of pulses on first ACK GPIO 30, and second BLE RF component 1404 may then respond with the same number of pulses on second ACK GPIO 1440. Upon loss of a data package (e.g., a packet), which may provoke a retransmission, main CPU/DSP component 1408 may hold off on further pulses on sending GPIO 1420 until all ACKs have been sent back on first ACK GPIO 1430 and second ACK GPIO 1440. ACK status may be determined in accordance with scenario 1000. For example, if a CIS #1 has three ACKs and a CIS #2 has two ACKs in a CIG #1, then first BLE RF component 1402 might merely send back two pulses on first ACK GPIO 1430 (since one buffer of CIS #2 may be holding according to scenario 1000). Main CPU/DPU 1408 may then adjust a buffer transaction on second ACK GPIO 1420 in a subsequent ISO period.

By using the mechanisms and methods discussed herein (such as scenario 1400), a system may advantageously be able to sync all audio payloads across various CIGs and various CISes.

FIG. 15 shows an example method 1500 for facilitating BLE transmission and synchronization. Method 1500 may comprise a generating 1510, a storing 1520, a determining 1530, and a generating 1540. In various embodiments, method 1500 may also comprise a generating 1550, a storing 1560, a determining 1570, and/or a generating 1580.

In generating 1510, a transmission to a BLE-compliant slave device may be generated, the transmission including a plurality of PDUs. In storing 1520, the plurality of PDUs may be stored in a buffer. In determining 1530, an error may be determined to have occurred in transmitting a PDU of the plurality of PDUs to the BLE-compliant slave device. In generating 1540, a re-transmission to the BLE-compliant slave device may be generated, the re-transmission including the PDU and any subsequent PDUs of the plurality of PDUs.

In some embodiments, each PDU of the plurality of PDUs may carry audio data for one of a plurality of audio channels.

In various embodiments, the transmission may be a first transmission, the BLE-compliant slave device may be a first BLE-compliant slave device, the plurality of PDUs may be a first plurality of PDUs, and the buffer may be a first buffer. In generating 1550, a second transmission to a second BLE-compliant slave device may be generated, the second transmission including a second plurality of PDUs. In storing 1560, the second plurality of PDUs may be stored in a second buffer. For various embodiments, the re-transmission may be a first re-transmission. In determining 1570, an error may be determined to have occurred in transmitting a PDU of the second plurality of PDUs to the second BLE-compliant slave device. In generating 1580, a second re-transmission to the second BLE-compliant slave device may be generated, the second re-transmission including the PDU and any subsequent PDUs of the second plurality of PDUs.

For some embodiments, the first plurality of PDUs may carry audio data for a first audio channel of a set of TWS audio channels, and the second plurality of PDUs may carry audio data for a second audio channel of a set of TWS audio channels.

In some embodiments, a size of the buffer is dynamically adjustable. For some embodiments, the dynamic adjustment may be based upon a frequency of flushing the buffer. In some embodiments, the determination that an error occurred in transmitting the PDU of the plurality of PDUs may be based on one of: a received NAK transmission from the BLE-compliant slave device; or a received ACK transmission from the BLE-compliant slave device.

FIG. 16 shows an example method 1600 for facilitating BLE transmission and synchronization. Method 1600 may comprise a generating 1610, a generating 1620, a determining 1630, and a determining 1640. In various embodiments, method 1600 may also comprise a storing 1650 and/or a storing 1660.

In generating 1610, a first transmission to a first BLE-compliant slave device may be generated in a first CIS event of a first CIG, the first transmission including a first set of PDUs. In generating 1620, a second transmission to a second BLE-compliant slave device may be generated in a second CIS event of the first CIG, the second transmission including a second set of PDUs. In determining 1630, it may be determined, based upon detecting a lost PDU of the first set of PDUs, whether to generate a first re-transmission to the first BLE-compliant slave device in a first CIS event of a second CIG group. The first re-transmission may include the lost PDU of the first set of PDUs and one or more subsequent PDUs of the first set of PDUs. In determining 1640, it may be determined, based upon detecting a lost PDU of the second set of PDUs, whether to generate a second re-transmission to the second BLE-compliant slave device in a second CIS event of the second CIG group. The second re-transmission may include the lost PDU of the second set of PDUs and one or more subsequent PDUs of the second set of PDUs.

In some embodiments, the first set of PDUs may be stored in a first buffer. For some embodiments, the second set of PDUs may be stored in a second buffer. In some embodiments, at least one of a size in PDUs of the first buffer and a size in PDUs of the second buffer may be dynamically adjustable. For some embodiments, the dynamic adjustment may be based upon a frequency of flushing the buffer.

In some embodiments, each PDU of the first set of PDUs may carry audio data for a first audio channel and each PDU of the second set of PDUs may audio data for a second audio channel. For some embodiments, the first audio channel and the second audio channel may be channels of a set of TWS audio channels. In some embodiments, the detection of a lost PDU may be based on receiving a NAK transmission from the BLE-compliant slave device, and/or an absence of a received ACK transmission from the BLE-compliant slave device.

FIG. 17 shows an example method 1700 for facilitating BLE transmission and synchronization. Method 1700 may comprise a generating 1710, a generating 1720, a determining 1730, and a determining 1740. In various embodiments, method 1700 may also comprise a storing 1750 and/or a storing 1760.

In generating 1710, a first transmission to a first BLE-compliant slave device may be generated. The first transmission may include a first plurality of PDUs. In generating 1720, a second transmission to a second BLE-compliant slave device may be generated. The second transmission may include a second plurality of PDUs. In determining 1730, it may be determined, based upon detecting a lost PDU of the first plurality of PDUs, whether to generate a first re-transmission to the first BLE-compliant slave device. The first re-transmission may include the lost PDU of the first plurality of PDUs and any subsequent PDUs of the first plurality of PDUs. In determining 1740, it may be determined, based upon detecting a lost PDU of the second plurality of PDUs, whether to generate a second re-transmission to the second BLE-compliant slave device. The second re-transmission may include the lost PDU of the second plurality of PDUs and any subsequent PDUs of the second plurality of PDUs.

In some embodiments, the first plurality of PDUs may carry audio data for a first audio channel of a set of TWS audio channels, and the second plurality of PDUs may carry audio data for a second audio channel of the set of TWS audio channels. For various embodiments, in storing 1750, the first plurality of PDUs may be stored in a first buffer. For various embodiments, in storing 1760, the second plurality of PDUs may be stored in a second buffer.

For some embodiments, at least one of a size in PDUs of the first buffer and a size in PDUs of the second buffer may be dynamically adjustable. In some embodiments, the detection of a lost PDU may be based at least on one of: a received NAK transmission from a BLE-compliant slave device, and/or an absence of a received ACK transmission from the BLE-compliant slave device.

The methods disclosed herein may be configured for the operation of the systems disclosed herein. Thus, the same advantages that apply to the systems may apply to the methods.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously.

In this way, by incorporating multiple TX buffers, BLE-compliant designs may achieve a technical effect of improving audio lacking. Some BLE-compliant designs may additionally achieve a technical effect of permitting a trade-off between latency and the extent of TX buffering in order to improve audio lacking while dynamically adjusting to varying rates of transmission loss and/or corruption.

FIG. 18 shows an example method 1800 for facilitating BLE dynamic buffer sizing. Method 1800 comprises a generating 1812, a storing 1814, a determining 1816, and an adjusting 1818. In various embodiments, method 1800 may also comprise a generating 1822, a generating 132, a storing 1834, a determining 1842, and/or an adjusting 1844.

In generating 1812, a plurality of data packages for transmission to a BLE-compliant slave device may be generated. In storing 1814, the plurality of data packages may be stored in a TX buffer having a storage depth of a number of data packages. In determining 1816, a determination may be made as to whether an error has occurred in transmitting the plurality data packages. In adjusting 1818, the storage depth of the TX buffer may be dynamically adjusted based upon a frequency of errors that occur in transmitting the plurality of data packages.

In some embodiments, the data packages may include one or more PDUs. For some embodiments, in generating 1822, a plurality of data packages may be generated for re-transmission to the BLE-compliant slave device. The plurality of data packages for re-transmission may include a data package for which an error occurred in transmission, and one or more subsequent data packages. In some embodiments, one or more data packages of the plurality of data packages may carry audio data for one or more of a plurality of audio channels.

For some embodiments, the data packages may be first data packages, the BLE-compliant slave device may be a first BLE-compliant slave device, the TX buffer may be a first TX buffer, and the storage depth of the first TX buffer may be a first number of data packages. In such embodiments, in generating 1832, a plurality of second data packages may be generated for transmission to a second BLE-compliant slave device, and in storing 1834, the plurality of second data packages may be stored in a second TX buffer having a storage depth of a second number of data packages.

In some embodiments, in determining 1842, a determination may be made as to whether an error has occurred in transmitting the plurality of second data packages, and in adjusting 1844, the storage depth of the second TX buffer may be dynamically adjusted based upon a frequency of errors that occur in transmitting the plurality of second data packages. For some embodiments, the plurality of first data packages may carry audio data for a first audio channel of a set of TWS audio channels, and the plurality of second data packages may carry audio data for a second audio channel of the set of TWS audio channels. In some embodiments, the determination of whether an error has occurred in transmitting the plurality of data packages may be based on a received NAK transmission from the BLE-compliant slave device and/or lack of a received ACK transmission from the BLE-compliant slave device.

For some embodiments, the determination of whether an error has occurred in transmitting the plurality of data packages may be based on a flushing of the TX buffer. In some embodiments, the storage depth of the TX buffer may be dynamically increased when a frequency of errors is greater than a first threshold rate of errors, and the storage depth of the TX buffer may be dynamically decreased when the frequency of errors is less than a second threshold rate of errors.

FIG. 19 shows an example method 1900 for facilitating BLE dynamic buffer sizing. Method 1900 comprises a generating 1912, a storing 1914, a generating 1916, a storing 1918, a determining 1920, and a determining 1922. In various embodiments, method 1900 may also comprise a generating 1932.

In generating 1912, a first set of PDUs may be generated for transmission to a first BLE-compliant slave device in a first event of a first CIS. In storing 1914, the first set of PDUs may be stored in a first TX buffer having a first storage depth of a number of PDUs. In generating 1916, a second set of PDUs may be generated for transmission to a second BLE-compliant slave device in a first event of a second CIS. In storing 1918, the second set of PDUs may be stored in a second TX buffer having a second storage depth of a number of PDUs. In determining 1920, it may be determined, based upon detecting whether an error has occurred in transmitting the first set of PDUs, whether to dynamically adjust the first storage depth. In determining 1922, it may be determined, based upon detecting whether an error has occurred in transmitting the second set of PDUs, whether to dynamically adjust the second storage depth.

In some embodiments, in generating 1932, a set of PDUs may be generated for re-transmission to one of the first BLE-compliant slave device and the second BLE-compliant slave device, based upon detecting whether an error has occurred in transmitting a set of PDUs for the corresponding BLE-compliant slave device. For some embodiments, the dynamic adjustment of at least one of the first storage depth and the second storage depth may be based upon a rate of received NAK transmissions from the corresponding BLE-compliant slave device and/or a rate of absence of expected ACK transmissions from the corresponding BLE-compliant slave device.

In some embodiments, the dynamic adjustment of at least one of the first storage depth and the second storage depth may be based upon a rate of buffer flushing. For some embodiments, each PDU of the first set of PDUs may carry audio data for a first audio channel, and each PDU of the second set of PDUs may carry audio data for a second audio channel. In some embodiments, the first audio channel and the second audio channel may be channels of a set of TWS audio channels.

FIG. 20 shows an example method 2000 for facilitating BLE dynamic buffer sizing. Method 2000 comprises a generating 2012, a storing 2014, a generating 2016, a storing 2018, a determining 2020, and a determining 2022. In various embodiments, method 2000 may comprise a determining 2032 and/or a determining 2034.

In generating 2012, a first plurality of PDUs may be generated for transmission to a first BLE-compliant slave device. In storing 2014, the first plurality of PDUs may be stored in a first TX buffer having a first storage depth of a number of PDUs. In generating 2016, a second plurality of PDUs may be generated for transmission to a second BLE-compliant slave device. In storing 2018, the second plurality of PDUs may be stored in a second TX buffer having a second storage depth of a number of PDUs. In determining 2020, it may be determined, based upon a rate of detected errors that occur in transmitting PDUs to the first BLE-compliant slave device, whether to dynamically adjust the first storage depth. In determining 2022, it may be determined, based upon a rate of detected errors that occur in transmitting PDUs to the second BLE-compliant slave device, whether to dynamically adjust the second storage depth.

In some embodiments, the first plurality of PDUs may carry audio data for a first audio channel of a set of TWS audio channels, and the second plurality of PDUs may carry audio data for a second audio channel of the set of TWS audio channels. For some embodiments, in determining 2032, it may be determined, based upon a detecting whether an error has occurred in transmitting the first plurality of PDUs, whether to generate a first plurality of PDUs for re-transmission to the first BLE-compliant slave device. The first plurality of PDUs for re-transmission may include a lost PDU of the first plurality of PDUs and one or more subsequent PDUs of the first plurality of PDUs. In determining 2034, it may be determined, based upon a detecting whether an error has occurred in transmitting the second plurality of PDUs, whether to generate a second plurality of PDUs for re-transmission to the second BLE-compliant slave device. The second plurality of PDUs for re-transmission may include a lost PDU of the second plurality of PDUs and one or more subsequent PDUs of the second plurality of PDUs.

For some embodiments, a rate of detected errors that occur in transmitting a set of PDUs may be based on a rate of received NAK transmissions from the BLE-compliant slave device and/or a rate of lack of expected ACK transmissions from the BLE-compliant slave device. In some embodiments, a rate of detected errors that occur in transmitting a set of PDUs may be based on a flushing of the TX buffer.

FIG. 21 shows an example method 2100 for facilitating BLE cross-CIG synchronization. Method 2100 comprises an establishing 2112, an establishing 2114, a generating 2116, and a scheduling 2118. In various embodiments, method 2100 may also comprise an establishing 2122, an establishing 2124, a generating 2126, and a scheduling 2128.

In establishing 2112, a CIG reference-point parameter may be established relative to a BLE ISO interval signal. In establishing 2114, a CIG synchronization-point parameter may be established relative to the ISO interval signal. In generating 2116, a set of PDUs may be generated for transmission to a set of one or more BLE-compliant slave devices corresponding with a CIG. In scheduling 2118, transmission of the set of PDUs may be scheduled for a time period having a beginning set by the CIG reference point parameter and an ending set by the CIG synchronization point parameter.

In some embodiments, the beginning of the first time period and the beginning of the second time period may be substantially synchronized. For some embodiments, the ISO interval signal may be connected to a GPIO pin of a processor.

For some embodiments, the CIG reference-point parameter may be established relative to a falling edge of the ISO interval signal. In some embodiments, the CIG reference-point parameter may correspond with an offset of a number of clock cycles from a falling edge of the ISO interval signal. For some embodiments, the CIG synchronization-point parameter may be established relative to a rising edge of the ISO interval signal. In some embodiments, the CIG synchronization-point parameter may correspond with an offset of a number of clock cycles from a rising edge of the ISO interval signal.

In some embodiments, the CIG reference-point parameter may be a first CIG reference-point parameter, the CIG synchronization-point parameter may be a first CIG synchronization-point parameter, the set of PDUs may be a first set of PDUs, the set of one or more BLE-compliant slave devices may be a first set of one or more BLE-compliant slave devices, and the time period may be a first time period, further comprising. In such embodiments, in establishing 2122, a second CIG reference-point parameter may be established relative to the ISO interval signal. In establishing 2124, a second CIG synchronization-point parameter may be established relative to the ISO interval signal. In generating 2126, a second set of PDUs may be generated for transmission to a second set of one or more BLE-compliant slave devices. In scheduling 2128, transmission of the second set of PDUs may be scheduled for a second time period having a beginning set by the second CIG reference point parameter and an ending set by the second CIG synchronization point parameter.

For some embodiments, the CIG may be a first CIG, and the second set of one or more BLE-compliant slave devices may correspond with a second CIG. In some embodiments, the set of PDUs may be for transmission to a plurality of BLE-compliant slave devices corresponding with a plurality of CISes.

FIG. 22 shows an example method 2200 for facilitating BLE cross-CIG synchronization. Method 2200 comprises an establishing 2212, an establishing 2214, a scheduling 2216, and a scheduling 2218. In various embodiments, method 2200 may also comprise a generating 2222 and/or a generating 2224.

In establishing 2212, a first CIG reference-point parameter and a second CIG reference-point parameter may be established relative to a BLE ISO interval signal. In establishing 2214, a first CIG synchronization-point parameter and a second CIG synchronization-point parameter may be established relative to the ISO interval signal. In scheduling 2216, a first time period for transmission of PDUs to a first set of one or more BLE-compliant slave devices may be scheduled, the first time period having a beginning set by the first CIG reference point parameter and an ending set by the first CIG synchronization point parameter. In scheduling 2218, a second time period for transmission of PDUs to a second set of one or more BLE-compliant slave devices may be scheduled, the second time period having a beginning set by the second CIG reference point parameter and an ending set by the second CIG synchronization point parameter.

In some embodiments, the beginning of the first time period and the beginning of the second time period may be substantially synchronized. For some embodiments, the ISO interval signal may be connected to a GPIO pin of a processor. In some embodiments, the first set of BLE-compliant slave devices may correspond with a first CIG, and the second set of BLE-compliant slave devices may correspond with a second CIG.

For some embodiments, in generating 2222, a first set of PDUs may be generated for transmission to a first set of one or more BLE-compliant slave devices. In generating 2224, a second set of PDUs may be generated for transmission to a second set of one or more BLE-compliant slave devices.

In some embodiments, the first CIG reference-point parameter and the second CIG reference-point parameter may be established relative to falling edges of the ISO interval signal, and the first CIG reference-point parameter and the second CIG reference-point parameter may correspond with offsets of a number of clock cycles from a falling edge of the ISO interval signal. For some embodiments, the first CIG synchronization-point parameter and the second CIG synchronization-point parameter may be established relative to rising edges of the ISO interval signal, and the first CIG synchronization-point parameter and the second CIG synchronization-point parameter may correspond with offsets of a number of clock cycles from rising edges of the ISO interval signal.

FIG. 23 shows an example method 2300 for facilitating BLE cross-CIG synchronization. Method 2300 comprises an establishing 2312, an establishing 2314, a scheduling 2316, and a scheduling 2318. In various embodiments, method 2300 may also comprise a generating 2322 and/or a generating 2324.

In establishing 2312, a first CIG reference-point parameter and a first CIG synchronization-point parameter may be established for a first set of BLE-compliant slave devices. In establishing 2314, a second CIG reference-point parameter and a second CIG synchronization-point parameter may be established for a second set of BLE-compliant slave devices. In scheduling 2316, a first time period for transmission of PDUs to the first set of BLE-compliant slave devices may be scheduled. The first time period may have a beginning set by the first CIG reference point parameter and an ending set by the first CIG synchronization point parameter. In scheduling 2318, a second time period for transmission of PDUs to the second set of BLE-compliant slave devices may be scheduled. The second time period may have a beginning set by the second CIG reference point parameter and an ending set by the second CIG synchronization point parameter. The beginning of the first time period and the beginning of the second time period may be substantially synchronized.

For some embodiments, the beginning of the first time period and the beginning of the second time period may be established relative to falling edges of an ISO interval signal, and the ending of the first time period and the ending of the second time period may be established relative to rising edges of the ISO interval signal. In some embodiments, in generating 2322, a first set of PDUs may be generated for transmission to the first set of BLE-compliant slave devices, and in generating 2324, a second set of PDUs may be generated for transmission to the second set of BLE-compliant slave devices.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the BLE-based designs incorporating multiple transmit-side buffers described above with respect to FIGS. 1-17. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

In a first approach to the methods and systems discussed herein, a first example of a method comprises: generating a transmission to a BLE-compliant slave device, the transmission including a plurality of PDUs; storing the plurality of PDUs in a buffer; determining that an error occurred in transmitting a PDU of the plurality of PDUs to the BLE-compliant slave device; and generating a re-transmission to the BLE-compliant slave device, the re-transmission including the PDU and any subsequent PDUs of the plurality of PDUs. Building off of the first example, in a second example of the method, each PDU of the plurality of PDUs carries audio data for one of a plurality of audio channels. Building off of either the first example or the second example, in a third example of the method, the transmission is a first transmission, the BLE-compliant slave device is a first BLE-compliant slave device, the plurality of PDUs is a first plurality of PDUs, and the buffer is a first buffer, and the method further comprises: generating a second transmission to a second BLE-compliant slave device, the second transmission including a second plurality of PDUs; and storing the second plurality of PDUs in a second buffer. Building off of the third example, in a fourth example of the method, the re-transmission is a first re-transmission, and the method further comprises: determining that an error occurred in transmitting a PDU of the second plurality of PDUs to the second BLE-compliant slave device; and generating a second re-transmission to the second BLE-compliant slave device, the second re-transmission including the PDU and any subsequent PDUs of the second plurality of PDUs. Building off of the fourth example, in a fifth example of the method, the first plurality of PDUs carries audio data for a first audio channel of a set of TWS audio channels; and the second plurality of PDUs carries audio data for a second audio channel of the set of TWS audio channels. Building off of any of the first example through the fifth example, in a sixth example of the method, a size of the buffer is dynamically adjustable. Building off of the sixth example, in a seventh example of the method, the dynamic adjustment is based upon a frequency of flushing the buffer. Building off of any of the first example through the seventh example, in an eighth example of the method, the determination that an error occurred in transmitting the PDU of the plurality of PDUs is based on one of: a received NAK transmission from the BLE-compliant slave device; or a received ACK transmission from the BLE-compliant slave device.

In a second approach to the methods and systems discussed herein, a first example of a method of synchronizing transmissions for multiple audio channels comprises: generating a first transmission to a first BLE-compliant slave device in a first CIS event of a first CIG, the first transmission including a first set of PDUs; generating a second transmission to a second BLE-compliant slave device in a second CIS event of the first CIG, the second transmission including a second set of PDUs; determining, based upon detecting a lost PDU of the first set of PDUs, whether to generate a first re-transmission to the first BLE-compliant slave device in a first CIS event of a second CIG, the first re-transmission including the lost PDU of the first set of PDUs and one or more subsequent PDUs of the first set of PDUs; and determining, based upon detecting a lost PDU of the second set of PDUs, whether to generate a second re-transmission to the second BLE-compliant slave device in a second CIS event of the second CIG, the second re-transmission including the lost PDU of the second set of PDUs and one or more subsequent PDUs of the second set of PDUs. Building off of the first example, in a second example of the method further comprises: storing the first set of PDUs in a first buffer; and storing the second set of PDUs in a second buffer. Building off of the second example, in a third example of the method, at least one of a size in PDUs of the first buffer and a size in PDUs of the second buffer is dynamically adjustable. Building off of the third example, in a fourth example of the method, the dynamic adjustment is based upon a frequency of flushing the buffer. Building off of the fourth example, in a fifth example of the method, each PDU of the first set of PDUs carries audio data for a first audio channel; and each PDU of the second set of PDUs carries audio data for a second audio channel. Building off of either the first example or the second example, in a sixth example of the method, the first audio channel and the second audio channel are channels of a set of TWS audio channels. Building off of any of the first example through the sixth example, in a seventh example of the method, the detection of a lost PDU is based on one of: receiving a NAK transmission from the BLE-compliant slave device; or an absence of a received ACK transmission from the BLE-compliant slave device.

In a third approach to the methods and systems discussed herein, a first example of a wireless personal area network master device comprises: one or more antennas; one or more processors; and a memory storing a plurality of instructions that, when executed, cause the one or more processors to: generate a first transmission to a first BLE-compliant slave device, the first transmission including a first plurality of PDUs; generate a second transmission to a second BLE-compliant slave device, the second transmission including a second plurality of PDUs; determine, based upon detecting a lost PDU of the first plurality of PDUs, whether to generate a first re-transmission to the first BLE-compliant slave device, the first re-transmission including the lost PDU of the first plurality of PDUs and any subsequent PDUs of the first plurality of PDUs; and determine, based upon detecting a lost PDU of the second plurality of PDUs, whether to generate a second re-transmission to the second BLE-compliant slave device, the second re-transmission including the lost PDU of the second plurality of PDUs and any subsequent PDUs of the second plurality of PDUs. Building off of the first example, in a second example of the BLE-compliant master device, the first plurality of PDUs carries audio data for a first audio channel of a set of TWS audio channels; and the second plurality of PDUs carries audio data for a second audio channel of the set of TWS audio channels. Building off of either the first example or the second example, in a third example of the BLE-compliant master device, the processors are further to: store the first plurality of PDUs in a first buffer; and store the second plurality of PDUs in a second buffer. Building off of the third example, in a fourth example of the BLE-compliant master device, at least one of a size in PDUs of the first buffer and a size in PDUs of the second buffer is dynamically adjustable. Building off of any of the first example through the fourth example, in a fifth example of the BLE-compliant master device, the detection of a lost PDU is based on one of: a received NAK transmission from a BLE-compliant slave device; or an absence of a received ACK transmission from the BLE-compliant slave device.

In a fourth approach to the methods and systems discussed herein, a first example of a method comprises: generating a plurality of data packages for transmission to a BLE-compliant slave device; storing the plurality of data packages in a TX buffer having a storage depth of a number of data packages; determining whether an error has occurred in transmitting the plurality data packages; and dynamically adjusting the storage depth of the TX buffer based upon a frequency of errors that occur in transmitting the plurality of data packages. In a second example building off of the first example, the data packages include one or more PDUs. In a third example building off of either the first example or the second example, the method further comprises: generating a plurality of data packages for re-transmission to the BLE-compliant slave device, and the plurality of data packages for re-transmission includes a data package for which an error occurred in transmission, and one or more subsequent data packages. In a fourth example building off of any of the first example through the third example, one or more data packages of the plurality of data packages carries audio data for one or more of a plurality of audio channels. In a fifth example building off of any of the first example through the fourth example, the data packages are first data packages, the BLE-compliant slave device is a first BLE-compliant slave device, the TX buffer is a first TX buffer, and the storage depth of the first TX buffer is a first number of data packages, and the method further comprises: generating a plurality of second data packages for transmission to a second BLE-compliant slave device; and storing the plurality of second data packages in a second TX buffer having a storage depth of a second number of data packages. In a sixth example building off of the fifth example, the method further comprises: determining whether an error has occurred in transmitting the plurality of second data packages; and dynamically adjusting the storage depth of the second TX buffer based upon a frequency of errors that occur in transmitting the plurality of second data packages. In a seventh example building off of either the fifth example or the sixth example, the plurality of first data packages carries audio data for a first audio channel of a set of TWS audio channels; and the plurality of second data packages carries audio data for a second audio channel of the set of TWS audio channels. In an eighth example building off of any of the first example through the seventh example, the determination of whether an error has occurred in transmitting the plurality of data packages is based on one of: a received NAK transmission from the BLE-compliant slave device; or lack of a received ACK transmission from the BLE-compliant slave device. In a ninth example building off of any of the first example through the eighth example, the determination of whether an error has occurred in transmitting the plurality of data packages is based on a flushing of the TX buffer. In a tenth example building off of any of the first example through the ninth example, the storage depth of the TX buffer is dynamically increased when a frequency of errors is greater than a first threshold rate of errors; and the storage depth of the TX buffer is dynamically decreased when the frequency of errors is less than a second threshold rate of errors.

In a fifth approach to the methods and systems discussed herein, a first example of a method of synchronizing transmissions for multiple audio channels comprises: generating a first set of PDUs for transmission to a first BLE-compliant slave device in a first event of a first CIS; storing the first set of PDUs in a first TX buffer having a first storage depth of a number of PDUs; generating a second set of PDUs for transmission to a second BLE-compliant slave device in a first event of a second CIS; storing the second set of PDUs in a second TX buffer having a second storage depth of a number of PDUs; determining, based upon detecting whether an error has occurred in transmitting the first set of PDUs, whether to dynamically adjust the first storage depth; and determining, based upon detecting whether an error has occurred in transmitting the second set of PDUs, whether to dynamically adjust the second storage depth. In a second example building off of the first example, the method further comprises: generating a set of PDUs for re-transmission to one of the first BLE-compliant slave device and the second BLE-compliant slave device, based upon detecting whether an error has occurred in transmitting a set of PDUs for the corresponding BLE-compliant slave device. In a third example building off of either the first example or the second example, the dynamic adjustment of at least one of the first storage depth and the second storage depth is based upon one or more of: a rate of received NAK transmissions from the corresponding BLE-compliant slave device; and a rate of absence of expected ACK transmissions from the corresponding BLE-compliant slave device. In a fourth example building off of any of the first example through the third example, the dynamic adjustment of at least one of the first storage depth and the second storage depth is based upon a rate of buffer flushing. In a fifth example building off of any of the first example through the fourth example, each PDU of the first set of PDUs carries audio data for a first audio channel; and each PDU of the second set of PDUs carries audio data for a second audio channel. In a sixth example building off of the fifth example, the first audio channel and the second audio channel are channels of a set of TWS audio channels.

In a sixth approach to the methods and systems discussed herein, a first example of a wireless personal area network master device comprises one or more antennas, one or more processors, and a memory storing a plurality of instructions that, when executed, cause the one or more processors to: generate a first plurality of PDUs for transmission to a first BLE-compliant slave device; store the first plurality of PDUs in a first TX buffer having a first storage depth of a number of PDUs; generate a second plurality of PDUs for transmission to a second BLE-compliant slave device; store the second plurality of PDUs in a second TX buffer having a second storage depth of a number of PDUs; determine, based upon a rate of detected errors that occur in transmitting PDUs to the first BLE-compliant slave device, whether to dynamically adjust the first storage depth; and determine, based upon a rate of detected errors that occur in transmitting PDUs to the second BLE-compliant slave device, whether to dynamically adjust the second storage depth. In a second example building off of the first example, the first plurality of PDUs carries audio data for a first audio channel of a set of TWS audio channels; and the second plurality of PDUs carries audio data for a second audio channel of the set of TWS audio channels. In a third example building off of either the first example or the second example, the instructions cause the one or more processors further to: determine, based upon a detecting whether an error has occurred in transmitting the first plurality of PDUs, whether to generate a first plurality of PDUs for re-transmission to the first BLE-compliant slave device, the first plurality of PDUs for re-transmission including a lost PDU of the first plurality of PDUs and one or more subsequent PDUs of the first plurality of PDUs; and determine, based upon a detecting whether an error has occurred in transmitting the second plurality of PDUs, whether to generate a second plurality of PDUs for re-transmission to the second BLE-compliant slave device, the second plurality of PDUs for re-transmission including a lost PDU of the second plurality of PDUs and one or more subsequent PDUs of the second plurality of PDUs. In a fourth example building off of any of the first example through the third example, a rate of detected errors that occur in transmitting a set of PDUs is based on at least one of: a rate of received NAK transmissions from the BLE-compliant slave device; and a rate of lack of expected ACK transmissions from the BLE-compliant slave device. In a fifth example building off of any of the first example through the fourth example, a rate of detected errors that occur in transmitting a set of PDUs is based on a flushing of the TX buffer.

In a seventh approach to the methods and systems discussed herein, a first example of a method comprises: establishing a CIG reference-point parameter relative to a BLE ISO interval signal; establishing a CIG synchronization-point parameter relative to the ISO interval signal; generating a set of PDUs for transmission to a set of one or more BLE-compliant slave devices corresponding with a CIG; and scheduling transmission of the set of PDUs for a time period having a beginning set by the CIG reference point parameter and an ending set by the CIG synchronization point parameter. In a second example building off of the first example, the ISO interval signal is connected to a GPIO pin of a processor. In a third example building off of either the first example or the second example, the CIG reference-point parameter is established relative to a falling edge of the ISO interval signal. In a fourth example building off of the third example, the CIG reference-point parameter corresponds with an offset of a number of clock cycles from a falling edge of the ISO interval signal. In a fifth example building off of any of the first example through the fourth example, the CIG synchronization-point parameter is established relative to a rising edge of the ISO interval signal. In a sixth example building off of the fifth example, the CIG synchronization-point parameter corresponds with an offset of a number of clock cycles from a rising edge of the ISO interval signal. In a seventh example building off of any of the first example through the sixth example, the CIG reference-point parameter is a first CIG reference-point parameter, the CIG synchronization-point parameter is a first CIG synchronization-point parameter, the set of PDUs is a first set of PDUs, the set of one or more BLE-compliant slave devices is a first set of one or more BLE-compliant slave devices, and the time period is a first time period, the method further comprises: establishing a second CIG reference-point parameter relative to the ISO interval signal; establishing a second CIG synchronization-point parameter relative to the ISO interval signal; generating a second set of PDUs for transmission to a second set of one or more BLE-compliant slave devices; and scheduling transmission of the second set of PDUs for a second time period having a beginning set by the second CIG reference point parameter and an ending set by the second CIG synchronization point parameter. In an eighth example building off of the seventh example, the beginning of the first time period and the beginning of the second time period are substantially synchronized. In a ninth example building off of either the seventh example or the eighth example, the CIG is a first CIG; and the second set of one or more BLE-compliant slave devices corresponds with a second CIG. In a tenth example building off of any of the first example through the ninth example, the set of PDUs is for transmission to a plurality of BLE-compliant slave devices corresponding with a plurality of CISes.

In an eighth approach to the methods and systems discussed herein, a first example of a method of synchronizing transmissions for multiple audio channels comprises: establishing a first CIG reference-point parameter and a second CIG reference-point parameter relative to a BLE ISO interval signal; establishing a first CIG synchronization-point parameter and a second CIG synchronization-point parameter relative to the ISO interval signal; scheduling a first time period for transmission of PDUs to a first set of one or more BLE-compliant slave devices, the first time period having a beginning set by the first CIG reference point parameter and an ending set by the first CIG synchronization point parameter; and scheduling a second time period for transmission of PDUs to a second set of one or more BLE-compliant slave devices, the second time period having a beginning set by the second CIG reference point parameter and an ending set by the second CIG synchronization point parameter. In a second example building off of the first example, the beginning of the first time period and the beginning of the second time period are substantially synchronized. In a third example building off of either the first example or the second example, the ISO interval signal is connected to a GPIO pin of a processor. In a fourth example building off of any of the first example through the third example, the first set of BLE-compliant slave devices corresponds with a first CIG; and the second set of BLE-compliant slave devices corresponds with a second CIG. In a fifth example building off of any of the first example through the fourth example, the method further comprises: generating a first set of PDUs for transmission to a first set of one or more BLE-compliant slave devices; and generating a second set of PDUs for transmission to a second set of one or more BLE-compliant slave devices. In a sixth example building off of any of the first example through the fifth example, the first CIG reference-point parameter and the second CIG reference-point parameter are established relative to falling edges of the ISO interval signal; and the first CIG reference-point parameter and the second CIG reference-point parameter correspond with offsets of a number of clock cycles from a falling edge of the ISO interval signal. In a seventh example building off of any of the first example through the sixth example, the first CIG synchronization-point parameter and the second CIG synchronization-point parameter are established relative to rising edges of the ISO interval signal; and the first CIG synchronization-point parameter and the second CIG synchronization-point parameter correspond with offsets of a number of clock cycles from rising edges of the ISO interval signal.

In a ninth approach to the methods and systems discussed herein, a first example of a method of synchronizing transmissions for multiple audio channels comprises: establishing a first CIG reference-point parameter and a first CIG synchronization-point parameter for a first set of BLE-compliant slave devices; establishing a second CIG reference-point parameter and a second CIG synchronization-point parameter for a second set of BLE-compliant slave devices; scheduling a first time period for transmission of PDUs to the first set of BLE-compliant slave devices, the first time period having a beginning set by the first CIG reference point parameter and an ending set by the first CIG synchronization point parameter; and scheduling a second time period for transmission of PDUs to the second set of BLE-compliant slave devices, the second time period having a beginning set by the second CIG reference point parameter and an ending set by the second CIG synchronization point parameter, wherein the beginning of the first time period and the beginning of the second time period are substantially synchronized. In a second example building off of the first example, the beginning of the first time period and the beginning of the second time period are established relative to falling edges of an ISO interval signal; and the ending of the first time period and the ending of the second time period are established relative to rising edges of the ISO interval signal. In a third example building off of either the first example or the second example, the method further comprises: generating a first set of PDUs for transmission to the first set of BLE-compliant slave devices; and generating a second set of PDUs for transmission to the second set of BLE-compliant slave devices.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. Terms such as "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A method comprising:
    generating a plurality of data packages for transmission to a Bluetooth Low Energy compliant (BLE-compliant) slave device;
    storing the plurality of data packages in a Transmit (TX) buffer having a storage depth of a number of data packages;
    determining whether an error has occurred in transmitting the plurality of data packages; and
    dynamically adjusting the storage depth of the TX buffer, by a number of data packages, based upon a frequency of errors that occur in transmitting the plurality of data packages,
    wherein the number of data packages by which the storage depth of the TX buffer is dynamically adjusted, based upon the frequency of errors that occur in transmitting the plurality of data packages, is selected from a group consisting of:
        a number of BLE Protocol Data Units (PDUs);
        a number of BLE NULL packets; and
        a number of BLE EMPTY packets.

2. The method of claim 1, wherein the data packages include one or more PDUs.

3. The method of claim 1, further comprising:
    generating a plurality of data packages for re-transmission to the BLE-compliant slave device, wherein the plurality of data packages for re-transmission includes a data package for which an error occurred in transmission, and one or more subsequent data packages.

4. The method of claim 1, wherein one or more data packages of the plurality of data packages carries audio data for one or more of a plurality of audio channels.

5. The method of claim 1, wherein the data packages are first data packages, the BLE-compliant slave device is a first BLE-compliant slave device, the TX buffer is a first TX buffer, and the storage depth of the first TX buffer is a first number of data packages, further comprising:
    generating a plurality of second data packages for transmission to a second BLE-compliant slave device; and
    storing the plurality of second data packages in a second TX buffer having a storage depth of a second number of data packages.

6. The method of claim 5, further comprising:
    determining whether an error has occurred in transmitting the plurality of second data packages; and
    dynamically adjusting the storage depth of the second TX buffer based upon a frequency of errors that occur in transmitting the plurality of second data packages.

7. The method of claim 5, wherein the plurality of first data packages carries audio data for a first audio channel of a set of True Wireless Stereo (TWS) audio channels; and
    wherein the plurality of second data packages carries audio data for a second audio channel of the set of TWS audio channels.

8. The method of claim 1, wherein the determination of whether an error has occurred in transmitting the plurality of data packages is based on one of:
    a received Negative Acknowledgement (NAK) transmission from the BLE-compliant slave device;
    or lack of a received Acknowledgement (ACK) transmission from the BLE-compliant slave device.

9. The method of claim 1, wherein the determination of whether an error has occurred in transmitting the plurality of data packages is based on a flushing of the TX buffer.

10. The method of claim 1, wherein the storage depth of the TX buffer is dynamically increased when a frequency of errors is greater than a first threshold rate of errors; and
    wherein the storage depth of the TX buffer is dynamically decreased when the frequency of errors is less than a second threshold rate of errors.

11. A method of synchronizing transmissions for multiple audio channels, the method comprising:
    generating a first set of Protocol Data Units (PDUs) for transmission to a first Bluetooth Low Energy compliant (BLE-compliant) slave device corresponding with a first audio channel, in a first event of a first Connected Isochronous Stream (CIS);
    storing the first set of PDUs in a first Transmit (TX) buffer having a first storage depth of a number of PDUs;
    generating a second set of PDUs for transmission to a second BLE-compliant slave device corresponding with a second audio channel, in a first event of a second CIS;
    storing the second set of PDUs in a second Transmit (TX) buffer having a second storage depth of a number of PDUs; and
    determining, based upon detecting whether an error has occurred in transmitting at least one of the first set of PDUs in the first TX buffer and the second set of PDUs in the second TX buffer, whether to dynamically adjust at least one of the first storage depth of the first audio channel and the second storage depth of the second audio channel to reduce audio lacking among the first audio channel and the second audio channel.

12. The method of claim 11, further comprising:
    generating a set of PDUs for re-transmission to one of the first BLE-compliant slave device and the second BLE-compliant slave device, based upon detecting whether an error has occurred in transmitting a set of PDUs for the corresponding BLE-compliant slave device.

13. The method of claim 11, wherein the dynamic adjustment of at least one of the first storage depth and the second storage depth is based upon one or more of:

a rate of received Negative Acknowledgement (NAK) transmissions from the corresponding BLE-compliant slave device; and a rate of absence of expected Acknowledgement (ACK) transmissions from the corresponding BLE-compliant slave device.

14. The method of claim 11, wherein the dynamic adjustment of at least one of the first storage depth and the second storage depth is based upon a rate of buffer flushing.

15. The method of claim 11, wherein each PDU of the first set of PDUs carries audio data for the first audio channel; and wherein each PDU of the second set of PDUs carries audio data for the second audio channel.

16. A wireless personal area network master device, comprising:

one or more antennas;

one or more processors; and a memory storing a plurality of instructions that, when executed, cause the one or more processors to:

generate a first plurality of Protocol Data Units (PDUs) for transmission to a first Bluetooth Low Energy compliant (BLE-compliant) slave device, the first plurality of PDUs carrying audio data for a first audio channel of a set of True Wireless Stereo (TWS) audio channels;

store the first plurality of PDUs in a first Transmit (TX) buffer having a first storage depth of a number of PDUs;

generate a second plurality of PDUs for transmission to a second BLE-compliant slave device, the second plurality of PDUs carrying audio data for a second audio channel of the set of TWS audio channels;

store the second plurality of PDUs in a second TX buffer having a second storage depth of a number of PDUs; and determining, based upon a rate of detected errors that occur in transmitting PDUs to at least one of the first BLE-compliant slave device and the second BLE-compliant slave device, whether to dynamically adjust at least one of the first storage depth of the first audio channel and the second storage depth of the second audio channel to synchronize the first audio channel of the set of TWS audio channels and the second audio channel of the set of TWS audio channels.

17. The BLE-compliant master device of claim 16, the instructions, when executed, cause the one or more processors further to:

determine, based upon a detecting whether an error has occurred in transmitting the first plurality of PDUs, whether to generate a first plurality of PDUs for re-transmission to the first BLE-compliant slave device, the first plurality of PDUs for re-transmission including a lost PDU of the first plurality of PDUs and one or more subsequent PDUs of the first plurality of PDUs; and determine, based upon a detecting whether an error has occurred in transmitting the second plurality of PDUs, whether to generate a second plurality of PDUs for re-transmission to the second BLE-compliant slave device, the second plurality of PDUs for re-transmission including a lost PDU of the second plurality of PDUs and one or more subsequent PDUs of the second plurality of PDUs.

18. The BLE-compliant master device of claim 16, wherein a rate of detected errors that occur in transmitting a set of PDUs is based on at least one of:

a rate of received Negative Acknowledgement (NAK) transmissions from the BLE-compliant slave device; and a rate of lack of expected Acknowledgement (ACK) transmissions from the BLE-compliant slave device.

19. The BLE-compliant master device of claim 16, wherein a rate of detected errors that occur in transmitting a set of PDUs is based on a flushing of the TX buffer.

* * * * *